United States Patent
Chapman et al.

(10) Patent No.: US 9,067,831 B2
(45) Date of Patent: Jun. 30, 2015

(54) HONEYCOMB STRUCTURE COMPRISING A MULTILAYER CEMENT SKIN

(71) Applicants: Thomas Richard Chapman, Painted Post, NY (US); Jacob George, Horseheads, NY (US); Ralph Henry Hagg, Corning, NY (US); Amit Halder, Ithaca, NY (US); Huthavahana Kuchibhotla Sarma, Horseheads, NY (US)

(72) Inventors: Thomas Richard Chapman, Painted Post, NY (US); Jacob George, Horseheads, NY (US); Ralph Henry Hagg, Corning, NY (US); Amit Halder, Ithaca, NY (US); Huthavahana Kuchibhotla Sarma, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 254 days.

(21) Appl. No.: 13/688,891

(22) Filed: Nov. 29, 2012

(65) Prior Publication Data

US 2014/0147621 A1 May 29, 2014

(51) Int. Cl.

| | |
|---|---|
| *B01D 46/24* | (2006.01) |
| *C04B 41/52* | (2006.01) |
| *C04B 38/00* | (2006.01) |
| *B29C 47/02* | (2006.01) |
| *B28B 19/00* | (2006.01) |
| *C04B 41/89* | (2006.01) |
| *C04B 41/00* | (2006.01) |
| *B28B 11/24* | (2006.01) |
| *B29C 47/54* | (2006.01) |
| *C04B 111/00* | (2006.01) |

(52) U.S. Cl.
CPC ..... *C04B 38/0006* (2013.01); *Y10T 428/24149* (2015.01); *B01D 46/2444* (2013.01); *B29C 47/028* (2013.01); *B28B 19/0038* (2013.01); *C04B 41/89* (2013.01); *C04B 41/009* (2013.01); *C04B 41/52* (2013.01); *C04B 2111/00793* (2013.01); *B28B 11/24* (2013.01); *B29C 47/54* (2013.01)

(58) Field of Classification Search
CPC .................................... C04B 41/526
See application file for complete search history.

(56) References Cited

U.S. PATENT DOCUMENTS

| | | | | |
|---|---|---|---|---|
| 4,540,535 | A | * | 9/1985 | Tomita et al. ............. 264/628 |
| 2006/0280905 | A1 | * | 12/2006 | Ichikawa ................... 428/116 |
| 2008/0220203 | A1 | * | 9/2008 | Ichikawa et al. .......... 428/116 |
| 2010/0055332 | A1 | | 3/2010 | Domey et al. ............. 427/356 |

(Continued)

FOREIGN PATENT DOCUMENTS

| | | |
|---|---|---|
| EP | 1702909 | 9/2006 |
| EP | 1704908 | 9/2006 |

(Continued)

OTHER PUBLICATIONS

Adler, "Ceramic Diesel Particulate Filters," 2005, Int. J. Appl. Ceram. Technol., 2, [6], 429-439.*

(Continued)

*Primary Examiner* — David Sample
*Assistant Examiner* — Nicholas W Jordan
(74) *Attorney, Agent, or Firm* — Charles A. Greene

(57) ABSTRACT

Disclosed is a ceramic honeycomb structure comprising a honeycomb body and a multilayered outer layer formed of a thick core layer applied and rapidly dried and a thin clad layer dried more gently to form a crack free dual skin layer. The core layer may have properties that are closer to those of the ceramic honeycomb body in service than the clad layer that may provide a tough outer shell to withstand handling and assembly.

11 Claims, 11 Drawing Sheets

(56) References Cited

U.S. PATENT DOCUMENTS

2010/0304041 A1   12/2010   Fletcher et al. ............... 427/542
2012/0301664 A1   11/2012   Chapman et al. ............. 428/116

FOREIGN PATENT DOCUMENTS

| | | | |
|---|---|---|---|
| JP | 2008043851 | | 2/2008 |
| JP | 2008043851 A | * | 2/2008 |
| WO | 2013054793 | | 4/2013 |
| WO | 2013082061 | | 6/2013 |

OTHER PUBLICATIONS

JP2008043851—machine translation.
WO2013054793—machine translation.
U.S. Appl. No. 13/463,125, filed May 3, 2012, "Apparatus and Method for Skinning Articles".
U.S. Appl. No. 61/602,883, filed Feb. 24, 2012, "Honeycomb Structure Comprising A Cement Skin Composition With Crystalline Inorganic Fibrous Material".

* cited by examiner

Skin

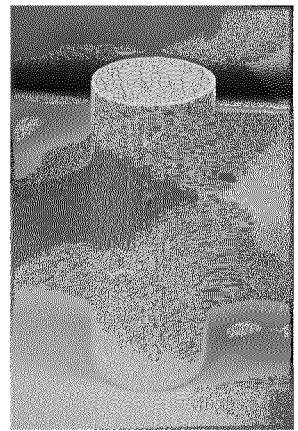
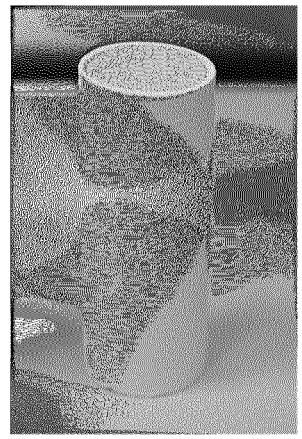
FIG. 9A  FIG. 9B
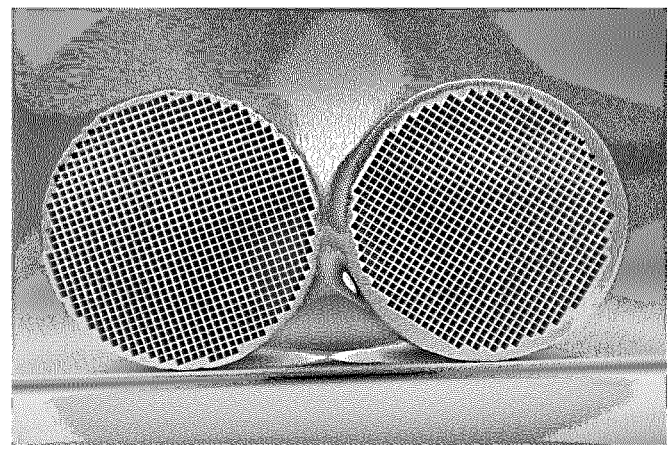
FIG. 9C

HONEYCOMB STRUCTURE COMPRISING A MULTILAYER CEMENT SKIN

BACKGROUND

1. Field

Exemplary embodiments of the present disclosure relate generally to honeycomb structures, and to ceramic honeycomb particulate filters and substrates comprising a multilayer outer skin layer exhibiting improved thermal expansion compatibility with the underlying honeycomb body, enhanced iso-static strength of the honeycomb structure, and improved manufacturing process times.

2. Technical Background

Particulate filters and substrates with large diameters may be difficult to manufacture to the tight dimensional requirements set by original equipment manufacturers (OEMs) and the supply chain due to unpredictable drying and firing shrinkage. Consequently, a cold set ceramic cement may be used to form an exterior skin of a honeycomb monolith including honeycomb monoliths formed by honeycomb segments. The cold set ceramic cement is mixed and applied to a fired, contoured or segmented substrate and the wet skin is afterward allowed to dry either under ambient conditions or by convective or microwave drying at elevated temperatures. The dried part is then ready to receive a catalyst coating and any further downstream processing if required.

Present skin designs embody conflicting physical property requirements between the final application and the intermediate processing and handling. In service, the material must have a low thermal expansion and high thermal shock resistance (low elastic modulus) to endure severe thermal gradients. To achieve these properties, high porosity and weak bonding are desired for maximum skin flexibility. To withstand shipping, handling and/or processing (including extreme pH exposure during catalyzation), high strength and chip/abrasion resistance are desired. To achieve these properties, low porosity and strong bonding between the skin and the ceramic body are sought for maximum skin strength.

The above information disclosed in this Background section is only for enhancement of understanding of the background of the invention as claimed and therefore it may contain information that does not form any part of the prior art nor what the prior art may suggest to a person of ordinary skill in the art.

SUMMARY

An exemplary embodiment provides a honeycomb structure comprising a honeycomb body including a plurality of cells extending axially between first and second opposing end faces of the honeycomb body, the cells comprising intersecting porous walls, and a first cement mixture layer deposited over a periphery of the honeycomb body. The first cement mixture layer may comprise a green cement mixture in that the cement mixture may be dried but not calcined, or the first cement mixture layer may be a calcined cement mixture. The honeycomb structure includes a second cement mixture layer deposited over the first cement mixture layer. The second cement mixture layer may comprise a green cement mixture, or the second cement mixture layer may be a calcined cement mixture.

An exemplary embodiment also discloses a method of making a honeycomb structure including coating the periphery of a honeycomb body with a first cement mixture, drying the first cement mixture on the periphery of the honeycomb body to form a first skin layer, coating the first skin layer with a second cement mixture, drying the second cement mixture on the periphery of the honeycomb body to form a second skin layer.

An exemplary embodiment also discloses a system for applying a dual skin layer to a honeycomb body including a first cement mixture applicator unit configured to coat a periphery of the honeycomb body with a first cement mixture, a drying unit configured to dry the first cement mixture to form a first skin layer on the periphery of the honeycomb body, a second cement mixture applicator unit configured to coat the first skin layer with a second cement mixture to be a second skin layer on the periphery of the honeycomb body when dried.

Additional features and advantages of the invention will be set forth in the description which follows, and in part will be apparent from the description, or recognized by practicing the invention.

It is to be understood that both the foregoing general description and the following detailed description present exemplary embodiments of the invention, and are intended to provide an overview or framework for understanding the nature and character of the invention as it is claimed.

BRIEF DESCRIPTION OF THE DRAWINGS

The accompanying drawings are included to provide a further understanding of the disclosure, and are incorporated into and constitute a part of this specification. The drawings illustrate various exemplary embodiments of the claimed invention, and together with the description serve to explain the principles and operations of the claimed invention.

FIG. 9A is a photograph showing an example core skin on a 2 in diameter honeycomb body according to an exemplary embodiment. Defects resulting from fast drying are visible. FIG. 9B is a photograph showing an example clad skin on a 2 in diameter honeycomb body having a core skin as shown in FIG. 9A according to an exemplary embodiment. Defects are eliminated through the second layer of skin. FIG. 9C is a photograph of the corresponding ends of the examples shown in FIGS. 9A and 9B.

DETAILED DESCRIPTION

Figure 1:
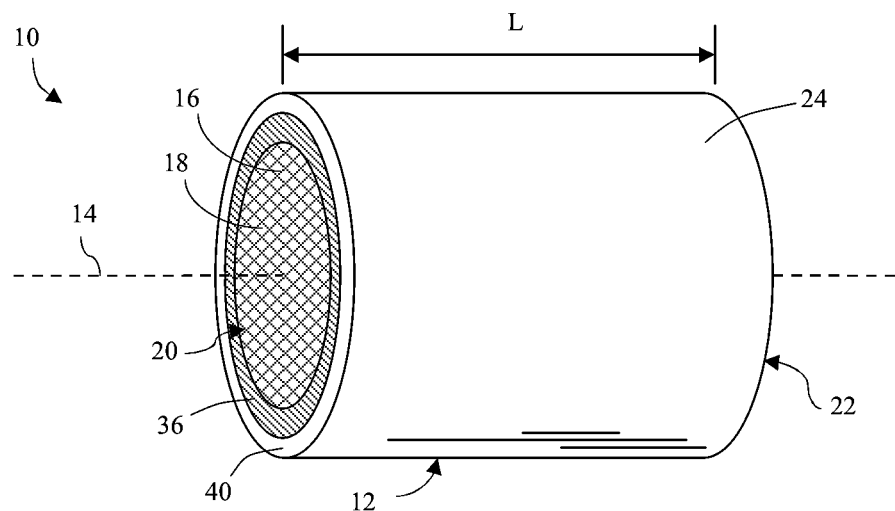
FIG. 1 is a perspective view of a honeycomb structure according to an exemplary embodiment of the present disclosure.

Reference will now be made in detail to exemplary embodiments of the disclosure, examples of which are illustrated in the accompanying drawings. Whenever possible, the same reference numeral will be used throughout the drawings to refer to the same or like parts. It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

As used herein, a green material is an unfired material comprising a mixture of inorganic and/or organic materials. The green material may include various inorganic filler materials, inorganic and/or organic binder materials, and liquid vehicle. The green material may be dried to remove fluid content (e.g. water). Drying is often accomplished by allowing a part to sit exposed to the ambient atmosphere overnight, however, hot air, forced air, microwave, radio frequency (RF) or infrared radiation (IR) may be used to augment drying. The drying may be accomplished in humidity controlled air. Green material may include cold-set cements.

As used herein, calcination refers to heating of a green material to a temperature less than 1000° C. for a period sufficient to burn out organic materials contained within the material, for example, 600° C. for about 3 hours.

As used herein, a "super addition" refers to a weight percent of a component, such as, for example, an organic binder, liquid vehicle, additive or pore former, based upon and relative to 100 weight percent of the inorganic components of the mixture.

Figure 2:
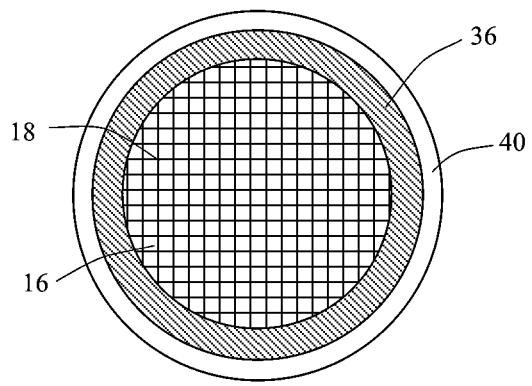
FIG. 2 is an end view of the honeycomb structure of FIG. 1.

Shown in FIGS. 1 and 2 is an exemplary honeycomb structure 10 according to one embodiment comprising a honeycomb body 12. The honeycomb body 12 has a longitudinal axis 14 and a length L, and comprises a plurality of intersecting porous walls 16 that form mutually adjoining cells or channels 18 extending axially between opposing end faces 20, 22. Cell density can be between 100 and 900 cells per square inch. Typical cell wall thicknesses can range from about 0.025 mm to about 1.5 mm. As used herein, the term "honeycomb" is intended to include a generally honeycomb structure but is not strictly limited to a square structure. For example, hexagonal, octagonal, triangular, rectangular or any other suitable shape may be used. Typical pore sizes contained within the porous walls can be from 0.1 µm to about 100 µm, with cell wall porosity between about 15% and 75%, for example, between about 25% and 60%.

Honeycomb body 12 may be formed from a ceramic material, such as cordierite ($2MgO-2Al_2O_3-5SiO_2$). However, limited substitution of other constituents such as Fe (iron), Co (cobalt), Ni (nickel) and Mn (manganese) for Mg (magnesium), Ga (gallium) for Al (aluminum) and Ge (germanium) for silicon is acceptable. Also, the cordierite phase may include alkali metals, alkaline earth metals or rare earth metals. Honeycomb body 12 may in other cases be made of other ceramic materials, such as silicon carbide, silicon nitride, aluminum titanate, alumina and/or mullite, or combinations thereof.

The honeycomb body can be formed according to any conventional process suitable for forming honeycomb monolithic bodies. For example, a plasticized ceramic forming batch composition can be shaped into a green body by any known conventional ceramic forming process, such as extrusion, injection molding, slip casting, centrifugal casting, pressure casting, dry pressing and the like. Typically, honeycomb structures are formed by an extrusion process where a ceramic material is extruded into a green form before the green form is fired to form the final ceramic structure. In an exemplary embodiment, the extrusion can be performed using a hydraulic ram extrusion press, a two stage de-airing single auger extruder or a twin screw mixer with a die assembly attached to the discharge end. The extruded material can be cut to create honeycomb structures such as filter bodies shaped and sized to meet the needs of engine manufacturers. The extruded material can be honeycomb segments connected or bonded together to form the honeycomb structures. These extruded green bodies can be any size or shape.

Generally, as a ceramic honeycomb structure is extruded, a solid external surface is provided along the length of the structure. Under certain circumstances, however, it may become necessary to remove the external surface. For example, a green extruded honeycomb structure may be shaped to a desired shape and size by removing the extruded external surface. Alternatively, the green honeycomb structure may be fired and then ground to the desired shape and size by removing the external extruded surface and any portion of the porous wall structure necessary to attain the desired shape and size. Shaping can be accomplished by any means known in the art, including cutting, sanding or grinding away the outer extruded surface of the honeycomb structure to achieve the desired shape and size.

Likewise, honeycomb segments may be shaped to a desired shape and size by removing the extruded external surface before integrating to the honeycomb structure. Alternatively, the honeycomb segments may be integrated to form a honeycomb structure and the formed honeycomb structure shaped to the desired shape and size.

Once the desired shape and size has been attained, a cement material can be applied to an outer periphery of the sized body to form a new external surface, or skin, on the body. Typically, the ends of the honeycomb body are not covered with the cement, although certain passages may be plugged if desired. Once the cement composition has been applied to the honeycomb structure, the cement composition can be dried and/or calcined. In some embodiments a cold-set cement composition may be applied to the honeycomb structure. In some embodiments, the honeycomb body over which the cement is applied comprises fired ceramic material. In other embodiments, the honeycomb body comprises a green body or a calcined body. In some cases, final firing of the calcined honeycomb structure can take place during the catalyzation process.

Once the cement material has been applied to the honeycomb structure in a manner as described herein, the cement material can be optionally dried and/or fired. The optional drying step can comprise first heating the cement material in a humidity controlled atmosphere at a temperature and for a period of time sufficient to at least substantially remove any liquid vehicle that may be present in the cement material. As used herein, at least substantially removing any liquid vehicle includes the removal of at least 95%, at least 98%, at least 99%, or even at least 99.9% of the liquid vehicle present in the cement material prior to firing. Exemplary and non-limiting drying conditions suitable for removing the liquid vehicle include heating the cement material at a temperature of at least 50° C., at least 60° C., at least 70° C., at least 80° C., at least 90° C., at least 100° C., at least 110° C., at least 120° C., at least 130° C., at least 140° C., at least 150° C., at least 160° C., at least 170° C., at least 180° C., at least 190° C., or even at least 200° C. In one embodiment, the conditions effective to at least substantially remove the liquid vehicle comprise heating the cement material in a humidity controlled atmosphere, such as air, at a temperature in the range of from 60° C. to 120° C. Further, the heating can be provided by any conventionally known method, including for example, hot air drying, RF and/or microwave drying in a humidity controlled atmosphere.

The optional firing step can include conditions suitable for converting the cement material to a primary crystalline phase ceramic composition include heating the honeycomb with applied cement material to a peak temperature of greater than 800° C., 900° C., and even greater than 1000° C. A ramp rate of about 120° C./hr during heating may be used, followed by a hold at the peak temperature for a temperature of about 3 hours, followed by cooling at about 240° C./hr.

Cement material disclosed herein can include those that set at a temperature of less than 200° C., such as a temperature of less than 100° C., and further such as a temperature of less than 50° C., including cement material that can be used in skinning processes employing "cold set" skins. In cold set skinning, only drying of the skinning mixture is required to form a seal of the channel walls of the honeycombs. When a cold set skinning process is employed, heating of the skinned honeycombs to temperatures in the 35-110° C. range can be useful to accelerate drying. In some cold set skinning processes, it is anticipated that final skin consolidation, including the removal of residual temporary binder bi-products and strengthening of the seals, can occur in the course of subsequent processing steps (e.g., in the course of catalyzation or canning) or during first use (e.g., in an exhaust system).

For example, exemplary compositions in which cold set skinning may be employed include those comprising a refractory filler that comprises at least one inorganic powder, such as at least one of aluminum titanate, cordierite, fused silica, mullite, and alumina, the inorganic powder having a bimodal or mono sized median particle size ($D_{50}$) of from 15 to 50 microns, such as from 30 to 40 microns for mono sized and additionally a median particle size in a range from about 150 microns to about 300 microns, such as from about 150 microns to about 250 microns for the second particle size in bimodal size compositions, and a gelled inorganic binder, such as gelled colloidal silica. At least one gelling agent, such as at least one of hydrochloric acid, sulfuric acid, nitric acid, citric acid, and acetic acid, ammonium hydroxide, sodium hydroxide, and triethanol amine (hereinafter "TEA") may be added either before (e.g., as a pre-mix with the gelled inorganic binder) or during batching in order to gel the inorganic binder. Alternatively a non-gelled composition may be used. Such compositions can provide skins that set in a porous ceramic honeycomb body (and be thereby permanently sealed to the channel walls) at a temperature of less than 200° C., such as less than 100° C., and further such as less than 50° C., including about 25° C. Further non-limiting exemplary embodiments of cement compositions used for skinning are discussed below.

Various methods may be employed to apply a layer of cement to the honeycomb body 12. For example, a dispensing device (not shown) can be used to apply an appropriate amount of cement mixture to the external surface of the honeycomb body 12. Methods of applying a skin material (e.g. cement) may include an axial application method, a doctor blade squeegee application method, a spray casting method, a tape casting method, a spin coating method, and the like. For example, U.S. patent application Ser. No. 13/463,125, the content of which is incorporated herein by reference in its entirety, describes various methods of applying a cement skin to a honeycomb body. For another example, U.S. patent application Ser. No. 12/231,140, the content of which is incorporated herein by reference in its entirety, also describes various methods of applying a cement skin to a honeycomb body.

Cement skins may crack when dried under humidity controlled conditions, for example, at ambient conditions, in a high temperature hot air drier, in a microwave heater, in a radio frequency (RF) heater, or in an infrared (IR) heater. Skin thickness variability may also contribute to the development of skin drying cracks. Longer times and lower temperature heating may be employed to avoid drying cracks, but at the expense of process through put efficiencies. Cracks on the skin may be manually detected after the drying process, and then manually fixed with skin cement. This may add further cost in terms of labor and time for inspecting and fixing of drying cracks. To reduce cracking during drying a low evaporation rate may be required. A low evaporation rate at the skin surface makes the drying process slow adding to manufacturing time and cost.

Figure 3:
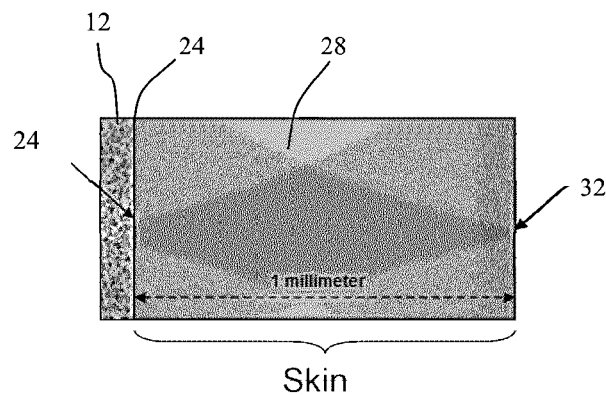
FIG. 3 is a schematic illustrating a model for drying by internal diffusion and surface evaporation.

FIG. 3 illustrates a model for calculating drying of a cement mixture on a periphery of a honeycomb body to form a skin layer. The model calculates drying by internal diffusion and surface evaporation. The honeycomb body 12 forms an interface 24 with the layer of cement mixture 28 applied to the outer periphery of the honeycomb body 12. The interface 24 of cement mixture layer 28 and honeycomb body 12 is treated as insulation in the model. A cement mixture layer surface and air interface 32 is treated as convective mass transfer in the model.

FIG. 3 shows the schematic of the internal diffusion and surface evaporation based model. The interface 24 of the cement mixture layer 28 (skin) and honeycomb body 12 (filter or substrate) is treated as an insulated layer for low porosity filters as water movement through a low porosity honeycomb body 12 is limited. In contrast, for high porosity filters, a separate mass transfer coefficient is provided at the honeycomb body 12 interface 24. The cement mixture layer 28 to air interface 32 loses moisture due to evaporation. The evaporation rate is a function of temperature, humidity and velocity of air.

Figure 4A:
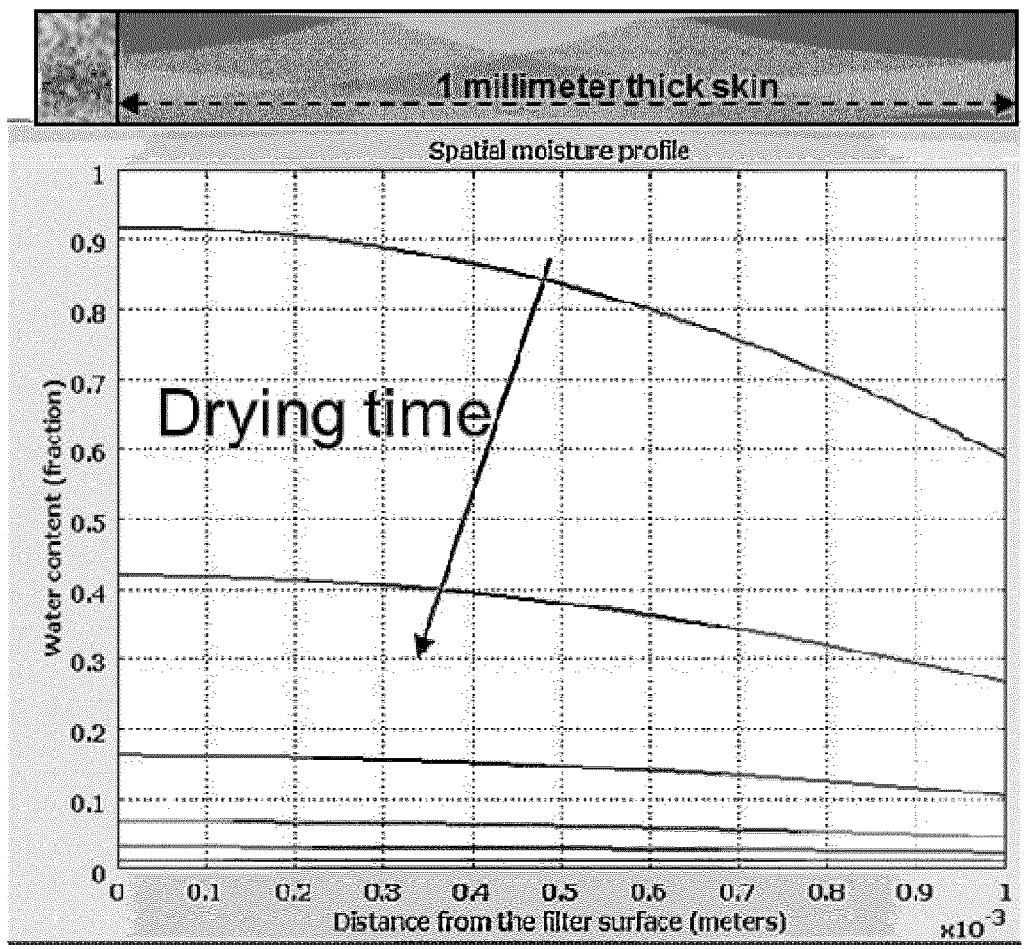
FIG. 4A is a graph illustrating gradual water content gradients for the model shown in FIG. 3 under slow drying conditions such as overnight.
Figure 4B:
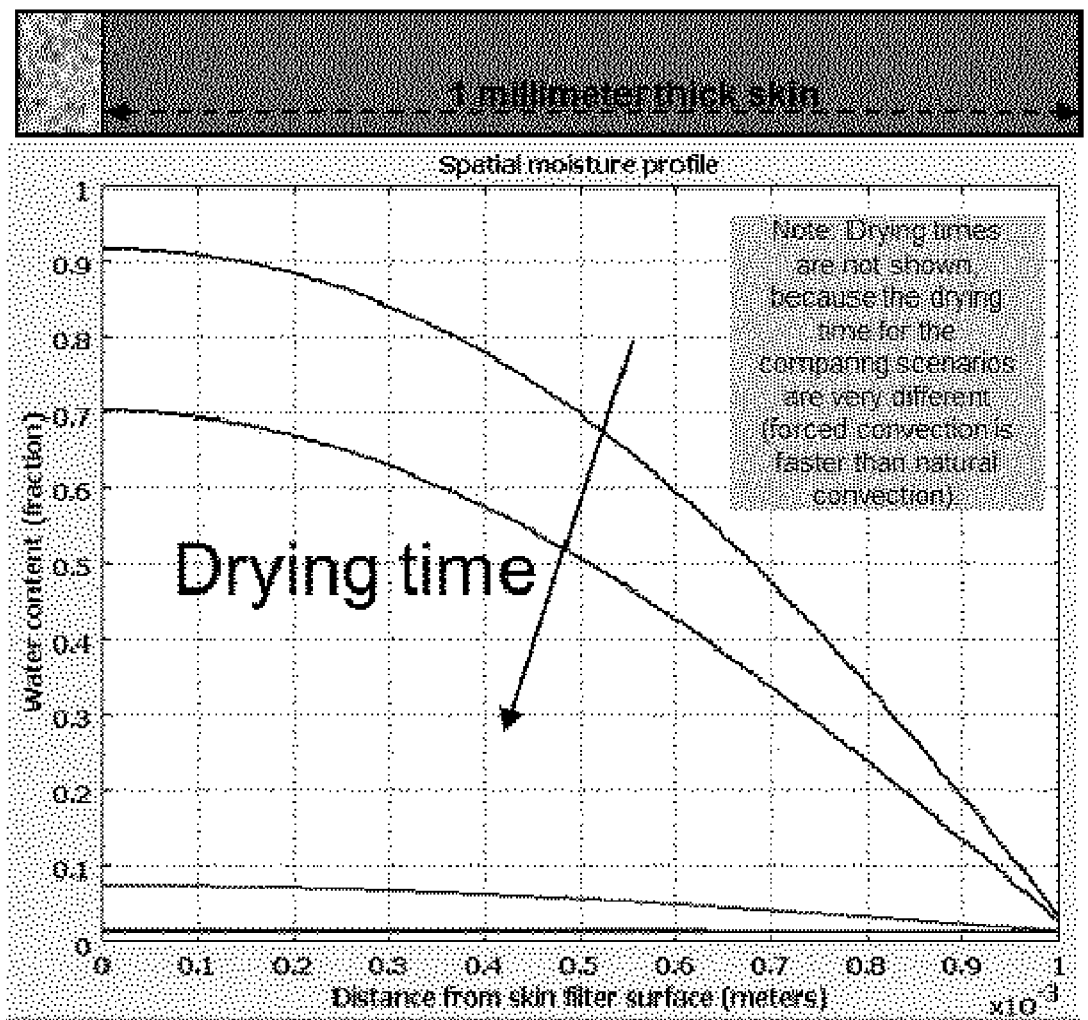
FIG. 4B is a graph illustrating steep water content gradients for the model shown in FIG. 3 under rapid drying conditions.

FIG. 4A is a graph illustrating gradual water content gradients for the model shown in FIG. 3 under slow drying conditions such as overnight (natural convection), and FIG. 4B is a graph illustrating steep water content gradients for the model shown in FIG. 3 under rapid drying conditions. In FIGS. 4A and 4B the gradients decrease as drying progresses as indicated by the drying time arrows. The steep gradients shown in FIG. 4B are formed in the case of forced convection drying (blowing hot air) because diffusion inside the skin cannot keep pace with the high evaporation rate at the air interface 32 surface of the cement mixture layer 28. In contrast, drying overnight shown in FIG. 4A leads to gentle gradients because the evaporation rate and the internal diffusion rates are similar.

Figure 5A:
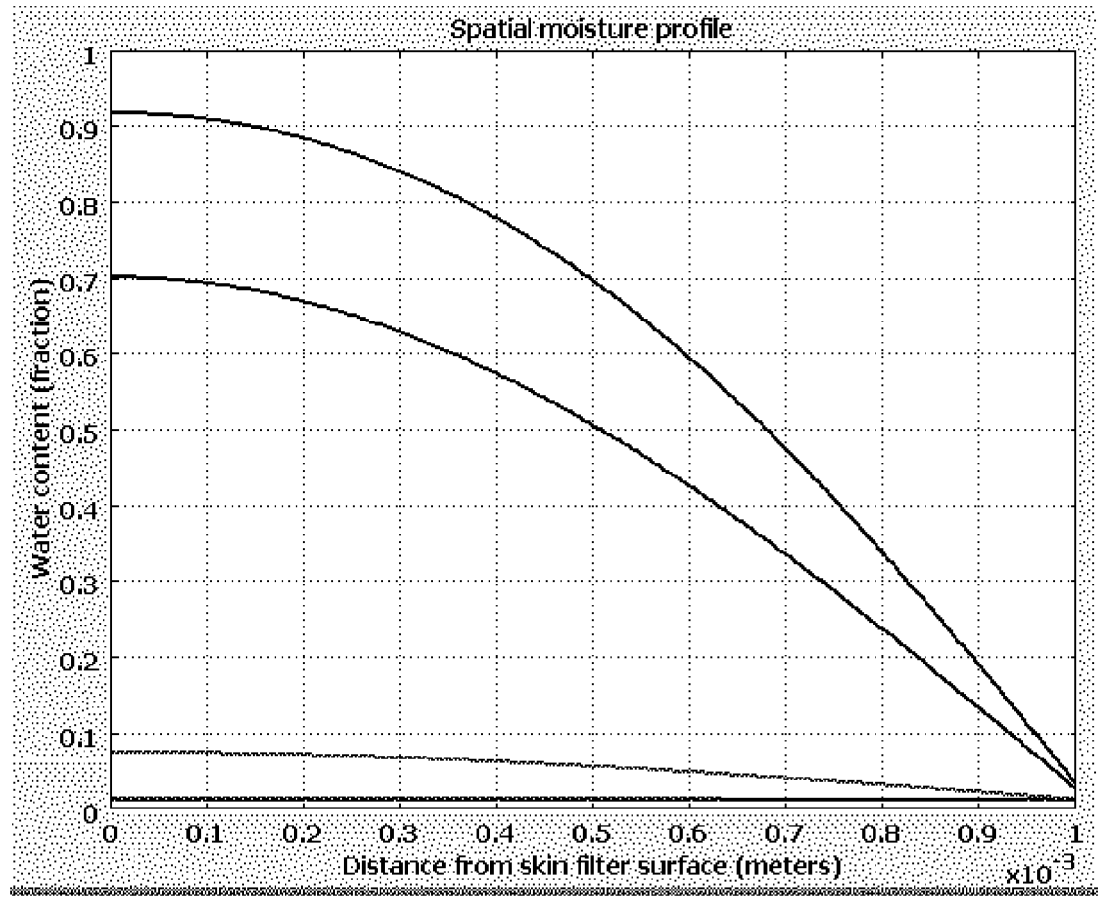
FIGS. 5A, 5B, and 5C are graphs illustrating water content gradients for the model shown in FIG. 3 in the presence of a non-porous (FIG. 5A), medium porous (FIG. 5B) and highly porous (FIG. 5C) honeycomb body that absorbs moisture from the skin, hence relaxing the moisture gradient.
Figure 5B:
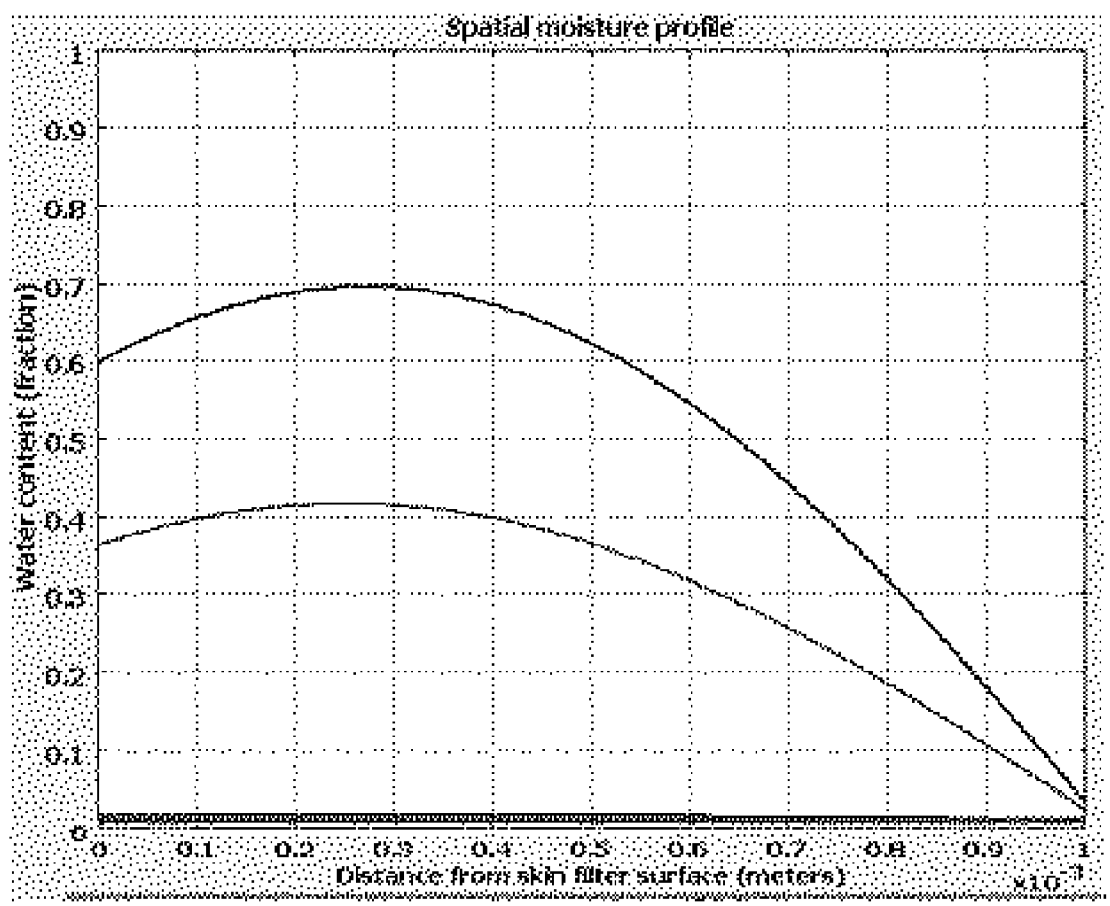
Figure 5C:
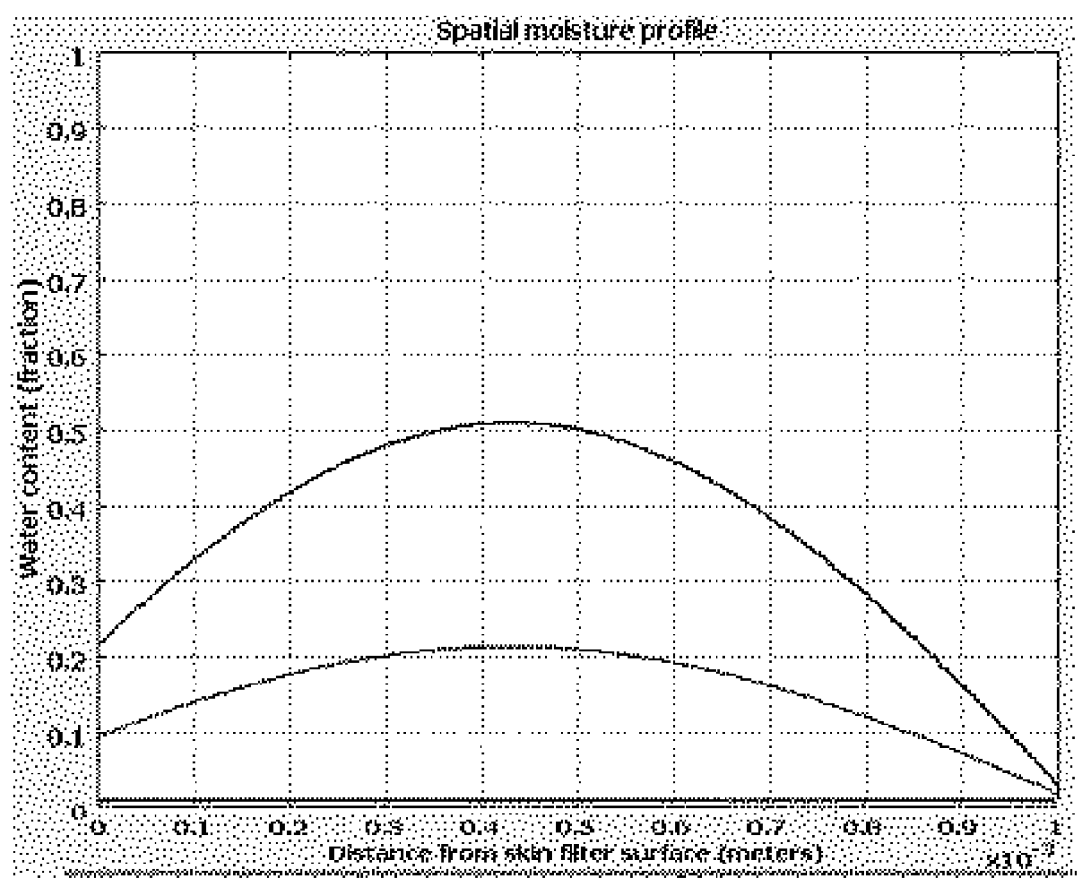

FIGS. 5A, 5B, and 5C are graphs illustrating water content gradients for the model shown in FIG. 3. FIG. 5A is a graph illustrating water content gradients for the model shown in FIG. 3 in the presence of a non-porous honeycomb body that does not absorb much moisture from the skin. FIG. 5B is a graph illustrating water content gradients for the model shown in FIG. 3 in the presence of a medium porous honeycomb body that absorbs some moisture from the skin, and FIG. 5C illustrates water content gradients in the presence of a highly porous honeycomb body that absorbs moisture from the skin, hence relaxing the moisture gradient. The results from the models were combined with experimental based observations of drying of a cement mixture on a periphery of a honeycomb body to form a skin layer as described below.

While the inventors observed that thin skins crack less than thick skins, thin skins are difficult to obtain consistently because of several factors. For instance, centering the honeycomb body on a rotation plate for coating with the cement mixture may be difficult, the filter body may have uneven contouring before coating, or a combination of these may cause variability in the thickness of the coating. Skin thickness variability generally makes the skin more susceptible to developing drying cracks.

Skin on top of a porous substrate/filter is less likely to crack than a skin on top of a non-porous (low porosity) substrate. Drying crack-free skins on low porosity substrates often presents a challenge.

Thin skins or fibrous skins are less prone to cracks during drying, but they are fragile and prone to cracks during handling or transportation.

The inventors discovered that a honeycomb body coated with a first cement mixture layer to form a first skin and a second cement mixture layer to form a second skin on top of the first skin gave a surprising crack free dual layer outer cement skin in a short period of time. Referring back to FIG. 1, the first cement mixture layer forms a core skin 36 and the second cement mixture layer forms a clad skin 40. The core skin 36 and the clad skin 40 may be of the same composition. Also, the core skin 36 and the clad skin 40 may be of different compositions from each other. The first cement mixture layer may be applied and rapidly dried in a process that uses high temperature hot air, forced air, microwave, RF, IR radiation, or the like. The rapid drying process may cause cracks in the core skin layer, but those cracks are removed when the second cement mixture is formed into the skin clad layer over the skin core layer. The thickness of the clad skin layer may be less than the thickness of the core skin layer. The drying process of the clad skin layer may be a slow drying process such as low temperature hot air drying, low power microwave, low power RF, low power IR radiation, and the like. The thinner layer and slower drying of the clad layer was discovered to lead to a crack free dual layer outer cement skin.

To achieve a crack free dual layer outer cement skin that withstands in service conditions the inner skin layer (core skin) exhibits a low thermal expansion and high thermal shock resistance (low elastic modulus) to endure severe thermal gradients. To achieve these properties, high porosity and weak bonding may be achieved for skin flexibility. The core skin may have a coefficient of thermal expansion (CTE) that substantially matches the honeycomb body.

The outer skin layer (clad skin) may be formed to withstand shipping, handling and/or processing (including extreme pH exposure during catalyzation). To achieve a crack free dual layer outer cement skin that withstands shipping, handling and processing, high strength and chip/abrasion resistance are desired. To achieve these properties, low porosity and strong bonding between the clad skin and the core skin on the ceramic body are sought for maximum clad skin strength.

Skin compositions are described in U.S. Provisional Patent Application No. 61/602,883 and U.S. patent application Ser. No. 13/302,262, the contents of which are incorporated herein by reference in their entirety. According to exemplary embodiments the skin composition may be a single glass powder composition including a cement comprising a glass powder as a low thermal expansion filler material, a binder and a solvent or vehicle for carrying the solid constituents of the glass-based cement. The glass of the glass powder filler material may be an amorphous fused silica ($SiO_2$), ground cordierite, AT grog, or silica soot. The glass powder filler material can have a median particle size (D50) between 10 and 20 μm, with a minimum particle size between 7 μm and 75 μm and a maximum particle size between 50 μm and 70 μm. Particle size determined as a mass-based equivalent spherical diameter. The glass powder filler material may comprise, for example, from 60-80 wt. % of the total inorganic components of the cement. Suitable silica powder filler materials are available, for example, under the trade name Teco-Sil, available from CE Minerals of Tennessee Electro Minerals Incorporated, Tennessee, USA. All particle size measurements herein were made with a Microtrac Inc. particle size analyzer, unless otherwise indicated.

According to exemplary embodiments the skin composition may include an amorphous glass-based cement, the cement formed from a dual glass powder composition comprising a first (fine) glass powder as a low thermal expansion filler material, a second (coarse) glass powder as a low thermal expansion filler material, a binder and a solvent or vehicle for carrying the solid constituents of the glass-based cement. The glasses of both the first glass powder filler material and the second glass powder filler material may be amorphous fused silica having particle sizes greater than about 1 μm. The distribution of glass powder filler material particle size is preferably multimodal in that a distribution of the glass powder filler material with particle sizes greater than about 1 μm exhibits multiple modes (local maximums) of particle sizes. In one embodiment, the amorphous glass-based cement comprises a bimodal particle size distribution of amorphous glass particles with a particle size greater than about 1 μm. The glass based cement may include a first glass powder filler material wherein a median (D50) particle size of the first glass powder filler material is preferably in a range from about 10 to about 50 μm, from about 15 μm to about 50 μm, from about 20 μm to about 45 μm or from about 30 μm to about 45 μm, with a D10 in a range from about 1 μm to about 10 μm and D90 in a range from about 25 μm to about 125 μm. A median (D50) particle size of the second glass powder filler material is preferably in a range from about 150 μm to about 300 μm, in a range from about 150 μm to about 250 μm, in a range from about 170 μm to about 230 μm, in a range from about 180 μm to about 220 μm, with D10 in a range from about 100 μm to about 150 μm, and D90 in a range from about 250 μm to about 350 μm. Particle sizes are determined as a mass-based equivalent spherical diameter. As used herein, the term D50 represents the median of the distribution of particle sizes, D10 represents the particle size in microns for which 10% of the distribution are smaller than the particle size, and D90 represents the particle size in microns for which 90% of the distribution are smaller than the particle size. The dual glass based cement may contain, for example, an amount of the first glass powder filler material in a range from about 20 to about 60 wt. % of the total weight of the inorganic solid components of the cement, in a range from about 25 wt. % to about 50 wt. %, in a range from about 25 wt. % to about 40 wt. %, or in a range from about 25 wt. % to about 35 wt. %. The glass based cement may contain, for example, an amount of the second glass powder filler material in a range from about 10 wt. % to about 40 wt. % of the total weight of the inorganic solid components of the cement, in a range from about 15 wt. % to about 40 wt. %, in a range from about 20 wt. % to about 35 wt. %.

In one exemplary embodiment, D50 of the first glass powder filler material may be in a range from about 34 μm to about 40 μm, and a median particle size of the second glass powder filler material is in a range from about 190 μm to about 280 μm. In one example, the first glass powder filler material has a D10 of about 6.0 μm, a D50 of about 34.9 μm and a D90 of about 99 μm. In another example, the first glass powder filler material has a D10 of about 6.7 μm, a D50 of about 39.8 μm, and a D90 of about 110.9 μm. In still another example, the first glass powder has a D10 of about 2.7 μm, a D50 of about 13.8 μm and a D90 of about 37.8 μm, and as yet another example, the first glass powder filler material has a D10 of about 2.8 μm, a D50 of about 17.2 μm and a D90 of about 47.9 μm.

The ratio of the second glass powder filler material to the first glass powder filler material may be in a range from about 1:4 to about 1:1, such as about 1:3.5 to about 1:1, from about 1:3 to about 1:1, from about 1:2.5 to about 1:1, from about 1.2 to about 1:1 or from about 1:1.5 to about 1:1. In an exemplary embodiment, the ratio of the second glass powder filler material to the first glass powder filler material is 1:1.

To provide the cement compositions of the present disclosure, the inorganic powders comprising any of the above inorganic powders and any optional inorganic additive components can be mixed together with a suitable organic and/or inorganic binder material. The organic binder material may comprise one or more organic materials, such as a cellulose ether, methylcellulose, ethylcellulose, polyvinyl alcohol, polyethylene oxide and the like, or in some embodiments a gum-like material such as Actigum®, xanthan gum or latex. For example, A4 Methocel is a suitable organic binder. Methocel A4 is a water-soluble methyl cellulose polymer binder available from Dow Chemical. A suitable inorganic binder may comprise colloidal silica or alumina comprising nanometer-scale silica or alumina particles suspended in a suitable liquid, such as water. The inorganic binder material is preferably present in the cement composition in an amount less than about 10% of the total weight of inorganic solids present in the cement, and in some exemplary embodiments inorganic binders are present in an amount equal to or less than about 5 wt. %, and in certain other exemplary embodiments in a range from about 2 wt. % to about 4 wt. % taking into account the fluid portion of the organic binder (wherein the weight contribution of the fluid portion is removed). A suitable colloidal silica binder material is Ludox HS40 produced by W. R. Grace. Typical colloidal binder materials may comprise approximately 40% by weight solid material as a suspension in a deionized water vehicle.

In some exemplary embodiments, the single and dual glass powder cements described supra may also include an inorganic fibrous reinforcing material. For example, aluminosilicate fibers may be added to the cement mixture to strengthen the honeycomb structure after application of the skin. For example, the cement may include an inorganic fibrous material from about 25 to about 50 wt. % of the total weight of the inorganic solid components of the cement, from about 30 to about 50 wt. %, and in some embodiments from about 35 to about 45 wt. % of the total weight of the inorganic solid components of the cement. In certain other embodiments, fibrous inorganic reinforcing materials may be present in an amount from about 36 wt. % to about 43 wt. % as a percentage of the total weight of the inorganic solids of the cement composition. A suitable inorganic fibrous reinforcing material is Fiberfrax QF 180, available from Unifrax, however, any high aspect ratio refractory particulate could be used.

Typically, the preferred liquid vehicle or solvent for providing a flowable or paste-like consistency has included water, such as deionized (DI) water, although other materials may be used. The liquid vehicle content may be present as a super addition in an amount equal to or less than about 30 wt. % of the inorganic components of the cement mixture, preferably in a range from about 10 wt. % to about 25 wt. % of the inorganic components of the cement mixture. However, the liquid vehicle is typically adjusted to obtain a viscosity suitable to make the cement easy to apply.

In some embodiments the cement may optionally further contain organic modifiers, such as adhesion promoters for enhancing adhesion between the cement and the honeycomb body. For example, Michem 4983 has been found suitable for this purpose.

In accordance with exemplary embodiments disclosed herein, the average coefficient of thermal expansion (CTE) of the calcined cement from 600° C. on cooling to room temperature is equal to or less than about $15 \times 10^{-7}/°$ C., preferably equal to or less than about $12 \times 10^{-7}/°$ C., preferably equal to or less than about $10 \times 10^{-7}/°$ C., preferably equal to or less than about $8 \times 10^{-7}/°$ C. As used herein room temperature means about 23° C. Preferably, a coefficient of thermal expansion of the calcined cement mixture is equal to a thermal expansion coefficient of the honeycomb body. In certain embodiments CTE can be in a range from about $7 \times 10^{-7}/°$ C. to about $10 \times 10^{-7}/°$ C.

In accordance with embodiments disclosed herein, the modulus of rupture (MOR) of uncalcined cement is in a range from about 20 kg/cm$^2$ to about 60 kg/cm$^2$, preferably in a range from about 20 kg/cm$^2$ to about 50 kg/cm$^2$, preferably in a range from about 20 kg/cm$^2$ to about 40 kg/cm$^2$, preferably in a range from about 20 kg/cm$^2$ to about 35 kg/cm$^2$. Modulus of rupture of uncalcined cement in some embodiments is between 22 kg/cm$^2$ and 35 kg/cm$^2$. In certain embodiments, the uncalcined MOR is in a range from about 24 kg/cm$^2$ to about 30 kg/cm$^2$.

In accordance with embodiments disclosed herein, the modulus of rupture (MOR) of calcined cement is in a range from about 14 kg/cm$^2$ to about 45 kg/cm$^2$, preferably in a range from about 14 kg/cm$^2$ to about 40 kg/cm$^2$, preferably in a range from about 14 kg/cm$^2$ to about 35 kg/cm$^2$, preferably in a range from about 14 kg/cm$^2$ to about 30 kg/cm$^2$. Modulus of rupture of calcined cement in some embodiments is between 14 kg/cm$^2$ and 25 kg/cm$^2$. In certain embodiments, the calcined MOR is in a range from about 14 kg/cm$^2$ to about 20 kg/cm$^2$.

Porosity of the calcined cement skin is in a range from about 30% to about 60%, preferably in a range from about 35% to about 60%, and preferably in a range from about 35% to about 50%. In some embodiments, porosity can be in a range from about 35% to about 48%.

Cement compositions described herein can exhibit viscosities well suited for forming an external skin over a honeycomb body. For example, compositions according to the embodiments herein can have an infinite shear viscosity equal to or less than about 12 Pascal-seconds (Pa·s), equal to or less than about 5 Pa·s, or equal to or less than about 4 Pa·s. For a shear rate of 10 s$^{-1}$, the shear viscosity is preferably equal to or less than about 400 Pa·s, equal to or less than about 350 Pa·s or less than or equal to about 300 Pa·s. Viscosity was measured using a parallel plate viscometer.

Calcined cement compositions described herein can exhibit an elastic modulus equal to or less than about $1\times10^6$ Pa, equal to or less than about $7\times10^5$ Pa, equal to or less than about $5\times10^5$ Pa or equal to or less than about $4\times10^5$ Pa. In certain embodiments the elastic modulus is in a range from about $2\times10^5$ Pa to about $6\times10^5$ Pa.

According to another exemplary embodiment the skin composition may include a cement comprising an inorganic filler material having a first coefficient of thermal expansion from 25° C. to 600° C. and a crystalline inorganic fibrous material having a second coefficient of thermal expansion from 25° C. to 600° C.

In exemplary embodiments, the inorganic filler material comprises at least 10% of the total weight of the inorganic solid components of the cement mixture and the crystalline inorganic fibrous material comprises less than 25% of the total weight of the inorganic solid components of the cement mixture. In exemplary embodiments, the first coefficient of thermal expansion is less than 50% of the second coefficient of thermal expansion.

For example, the inorganic filler material can comprise from 20% to 80%, such as from 25% to 75%, and further such as from 30% to 70%, and yet further such as from 35% to 65%, including at least 50%, at least 60%, or at least 70% of the total weight of the inorganic solids components of the cement mixture. The crystalline inorganic fibrous material can comprise from 3% to 20%, such as from 5% to 15%, and further such as from 8% to 12%, including less than 10%, less than 15%, or less than 20% of the total weight of the inorganic solids components of the cement mixture.

The first coefficient of thermal expansion, can, in certain exemplary embodiments range from $0.5\times10^{-7}$/° C. to $20\times10^{-7}$/° C., such as from $1.0\times10^{-7}$/° C. to $10\times10^{-7}$/° C. and further such as from $2.0\times10^{-7}$/° C. to $5\times10^{-7}$/° C., including less than $7\times10^{-7}$/° C., and including about $2.5\times10^{-7}$/° C. The second coefficient of thermal expansion can, in certain exemplary embodiments, range from $10\times10^{-7}$/° C. to $100\times10^{-7}$/° C., such as from $20\times10^{-7}$/° C. to $90\times10^{-7}$/° C., and further such as from $30\times10^{-7}$/° C. to $80\times10^{-7}$/° C., including at least $50\times10^{-7}$/° C., and including about $65\times10^{-7}$/° C. The first coefficient of thermal expansion can, in certain exemplary embodiments, be less than $5\times10^{-7}$/° C. while the second coefficient of thermal expansion can be greater than $30\times10^{-7}$/° C. The first coefficient of thermal expansion can, in certain exemplary embodiments, be less than 25% of the second coefficient of thermal expansion, such as less than 20% of the second coefficient of thermal expansion, and further such as less than 15% of the second coefficient of thermal expansion, and yet further such as less than 10% of the second coefficient of thermal expansion, and still yet further such as less than 5% of the second coefficient of thermal expansion, such as from 1% to 20% of the second coefficient of thermal expansion, and further such as from 2% to 10% of the second coefficient of thermal expansion.

In certain exemplary embodiments, at least 50% by weight of the crystalline inorganic fibrous material has an aspect ratio (longest dimension divided by shortest dimension) of from 3:1 to 10:1, such as from 4:1 to 8:1. In certain exemplary embodiments, less than 10% by weight of the crystalline inorganic fibrous material has an aspect ratio of less than 3:1.

In certain exemplary embodiments, less than 5% by weight of the crystalline inorganic fibrous material has an aspect ratio of less than 3:1. In certain exemplary embodiments, the average aspect ratio of the crystalline inorganic fibrous material is from 3:1 to 10:1, such as from 4:1 to 8:1, including about 5:1.

In certain exemplary embodiments, the crystalline inorganic fibrous material has an average diameter of from 2 to 80 microns, such as from 5 to 50 microns, and further such as from 10 to 30 microns. The crystalline inorganic fibrous material can, in certain exemplary embodiments, have an average length of from 10 to 500 microns, such as from 50 to 400 microns, and further such as from 100 to 300 microns.

In certain exemplary embodiments, the crystalline inorganic fibrous material can comprise a finer fibrous material having an average diameter of from 2 to 10 microns and an average length of from 10 to 50 microns. The crystalline inorganic fibrous material may also comprise a relatively coarser fibrous material having an average diameter of from 20 to 60 microns and an average length of from 100 to 300 microns. The crystalline inorganic fibrous material may also comprise a fibrous material of intermediate coarseness, having an average diameter of from 10 to 20 microns and an average length of from 50 to 100 microns.

The crystalline inorganic fibrous material can, in certain exemplary embodiments, be present in the cement mixture in a single distribution (e.g., of only one of a finer fibrous material, coarser fibrous material, and fibrous material of intermediate coarseness), a bi-modal distribution (e.g., of two of a finer fibrous material, coarser fibrous material, and fibrous material of intermediate coarseness), or a tri-modal distribution (e.g., of three of a finer fibrous material, coarser fibrous material, and fibrous material of intermediate coarseness).

A finer fibrous material may correlate to a lower amount of said fibrous material being present in certain exemplary cement mixtures having similar characteristics with respect to at least one property. Accordingly, one set of exemplary embodiments includes a cement mixture comprising a crystalline inorganic fibrous material, which comprises from 3% to 10% of the total weight of the inorganic solid components of the cement mixture, wherein the crystalline inorganic fibrous material has an average diameter of from 2 to 10 microns and an average length of from 10 to 50 microns. Exemplary embodiments also include those having a cement mixture comprising a crystalline inorganic fibrous material, which comprises from 5% to 15% of the total weight of the inorganic solid components of the cement mixture, wherein the crystalline inorganic fibrous material has an average diameter of from 10 to 20 microns and an average length of from 50 to 100 microns. Exemplary embodiments also include those having a cement mixture comprising a crystalline inorganic fibrous material, which comprises from 10% to 20% of the total weight of the inorganic solid components of the cement mixture, wherein the crystalline inorganic fibrous material has an average diameter of from 20 to 60 microns and an average length of from 100 to 300 microns.

In certain exemplary embodiments, less than 5%, such as less than 2%, and further such as less than 1% by weight of the crystalline inorganic fibrous material has a diameter of greater than 250 microns. In certain exemplary embodiments, the crystalline inorganic fibrous material is essentially free of material having a diameter of greater than 250 microns.

In certain exemplary embodiments, less than 5%, such as less than 2%, and further such as less than 1% by weight of the crystalline inorganic fibrous material has a diameter of greater than 200 microns. In certain exemplary embodiments, the crystalline inorganic fibrous material is essentially free of material having a diameter of greater than 200 microns.

In certain exemplary embodiments, less than 5%, such as less than 2%, and further such as less than 1% by weight of the crystalline inorganic fibrous material has a diameter of greater than 150 microns. In certain exemplary embodiments, the crystalline inorganic fibrous material is essentially free of material having a diameter of greater than 150 microns.

In certain exemplary embodiments, less than 5%, such as less than 2%, and further such as less than 1% by weight of the crystalline inorganic fibrous material has a diameter of greater than 100 microns. In certain exemplary embodiments, the crystalline inorganic fibrous material is essentially free of material having a diameter of greater than 100 microns.

In certain exemplary embodiments, less than 5%, such as less than 2%, and further such as less than 1% by weight of the crystalline inorganic fibrous material has a diameter of greater than 50 microns. In certain exemplary embodiments, the crystalline inorganic fibrous material is essentially free of material having a diameter of greater than 50 microns.

In certain exemplary embodiments, the crystalline inorganic fibrous material consists essentially of inorganic fibers having an aspect ratio of at least 2:1. In certain exemplary embodiments, the crystalline inorganic fibrous material contains less than 5%, such as less than 2%, and further such as less than 1% by weight of shot or filler material. In certain exemplary embodiments, the crystalline inorganic fibrous material is essentially free of shot or filler material.

In certain exemplary embodiments, at least 95%, such as at least 98%, and further such as at least 99% by weight of the crystalline inorganic fibrous material has an aspect ratio of at least 2:1. In certain exemplary embodiments, substantially all of the crystalline inorganic fibrous material has an aspect ratio of at least 2:1.

In certain exemplary embodiments, the crystalline inorganic fibrous material comprises a naturally occurring crystalline inorganic fibrous material. In certain exemplary embodiments, the crystalline inorganic fibrous material comprises an alkaline earth silicate, such as a naturally occurring alkaline earth silicate. An example of a suitable alkaline earth silicate is wollastonite ($CaSiO_3$), such as that available under the trade name Ultrafibe II, available from NYCO Minerals Incorporated, Willsboro, N.Y., USA.

In certain exemplary embodiments, the inorganic filler material comprises at least one of ground cordierite and fused silica glass powder.

In certain exemplary embodiments, the inorganic filler material comprises cordierite, such as ground cordierite.

In certain exemplary embodiments, the inorganic filler material comprises glass powder, such as fused silica glass powder.

The glass powder filler material can have a median particle size (D50) between 10 and 20 μm, with, for example, a minimum particle size between 7 μm and 75 μm and a maximum particle size between 50 μm and 70 μm. Particle size was determined as a mass-based equivalent spherical diameter. The glass powder filler material may comprise, for example, from 60% to 80% by weight of the total inorganic components of the cement. Suitable silica powder filler materials are available, for example, under the trade name Teco-Sil, available from CE Minerals of Tennessee Electro Minerals Incorporated, Tennessee, USA. All particle size measurements herein were made with a Microtrac Inc. particle size analyzer, unless otherwise indicated.

In another exemplary embodiment, the skin of the honeycomb structure may comprise an amorphous glass-based cement, the cement formed from a composition comprising a first (fine) glass powder as a low thermal expansion filler material, a second (coarse) glass powder as a low thermal expansion filler material, a crystalline inorganic fibrous material, a binder and a solvent or vehicle for carrying the solid constituents of the glass-based cement. In certain exemplary embodiments, the glasses of both the first glass powder filler material and the second glass powder filler material are amorphous fused silica having particle sizes greater than about 1 micron. The distribution of glass powder filler material particle size may be multimodal in that a distribution of the glass powder filler material with particle sizes greater than about 1 micron exhibits multiple modes (local maximums) of particle sizes. In one embodiment, the amorphous glass-based cement comprises a bimodal particle size distribution of amorphous glass particles with a particle size greater than about 1 micron. The glass based cement may include a first glass powder filler material wherein a median (D50) particle size of the first glass powder filler material can be in a range from about 10 microns to about 50 microns, from about 15 microns to about 50 microns, from about 20 microns to about 45 microns or from about 30 microns to about 45 microns, with a D10 in a range from about 1 micron to about 10 microns and D90 in a range from about 25 microns to about 125 microns. A median (D50) particle size of the second glass powder filler material can be in a range from about 150 microns to about 300 microns, in a range from about 150 microns to about 250 microns, in a range from about 170 microns to about 230 microns, in a range from about 180 microns to about 220 microns, with D10 in a range from about 100 microns to about 150 microns, and D90 in a range from about 250 microns to about 350 microns. Particle sizes are determined as a mass-based equivalent spherical diameter.

The glass based cement may contain, for example, an amount of the first glass powder filler material in a range from about 20% to about 60% by weight of the total weight of the inorganic solid components of the cement, in a range from about 25% to about 50% by weight, in a range from about 25% to about 40% by weight, or in a range from about 25% to about 35% by weight. The glass based cement may contain, for example, an amount of the second glass powder filler material in a range from about 10% to about 40% by weight of the total weight of the inorganic solid components of the cement, in a range from about 15% to about 40% by weight, in a range from about 20% to about 35% by weight.

In one embodiment, D50 of the first glass powder filler material may be in a range from about 34 microns to about 40 microns, and a median particle size of the second glass powder filler material is in a range from about 190 microns to about 280 microns. In one example, the first glass powder filler material has a D10 of about 6.0 microns, a D50 of about 34.9 microns and a D90 of about 99 microns. In another example, the first glass powder filler material has a D10 of about 6.7 microns, a D50 of about 39.8 microns, and a D90 of about 110.9 microns. In still another example, the first glass powder has a D10 of about 2.7 microns, a D50 of about 13.8 microns and a D90 of about 37.8 microns, and as yet another example, the first glass powder filler material has a D10 of about 2.8 microns, a D50 of about 17.2 microns and a D90 of about 47.9 microns.

The ratio of the second glass powder filler material to the first glass powder filler material may be in a range from about 1:4 to about 1:1, such as about 1:3.5 to about 1:1, from about 1:3 to about 1:1, from about 1:2.5 to about 1:1, from about 1.2 to about 1:1 or from about 1:1.5 to about 1:1. In one exemplary embodiment, the ratio of the second glass powder filler material to the first glass powder filler material is about 1:1.

To provide the cement compositions of the present disclosure, the inorganic powders comprising any of the above inorganic powders and any optional inorganic additive components can be mixed together with a suitable organic and/or inorganic binder material. The organic binder material may comprise one or more organic materials, such as a cellulose ether, methylcellulose, ethylcellulose, polyvinyl alcohol, polyethylene oxide and the like, or in some embodiments a gum-like material such as Actigum®, xanthan gum or latex. For example, A4 Methocel is a suitable organic binder. Methocel A4 is a water-soluble methyl cellulose polymer binder available from Dow Chemical. The organic binder material may, for example, be present in the cement composition in an amount of from 0.1% to 10% by weight, such as from 0.2% to 5%, and further such as from 0.5% to 2%.

A suitable inorganic binder may comprise colloidal silica or alumina comprising nanometer-scale silica or alumina particles suspended in a suitable liquid, such as water. The inorganic binder material may, for example, be present in the cement composition in an amount less than about of from 2% to 35% of the total weight of inorganic solids present in the cement, and in some embodiments inorganic binders are present in an amount of from 5% to 30%, and in certain other embodiments in an amount of from 10% to 25%. A suitable colloidal silica binder material is Ludox HS-40 produced by W. R. Grace. Typical colloidal binder materials may comprise approximately 40% by weight solid material as a suspension in a deionized water vehicle.

Typically, the preferred liquid vehicle or solvent for providing a flowable or paste-like consistency has included water, such as deionized (DI) water, although other materials may be used. The liquid vehicle content may be present as a super addition in an amount equal to or less than about 30% of the total weight of the inorganic components of the cement mixture, such as a range of from about 10% to about 25% of the total weight of the inorganic components of the cement mixture. However, the liquid vehicle is typically adjusted to obtain a viscosity suitable to make the cement easy to apply.

In some embodiments, the cement may optionally further contain organic modifiers, such as adhesion promoters for enhancing adhesion between the cement and the honeycomb body. For example, Michem 4983 has been found suitable for this purpose.

In certain exemplary embodiments, the cement mixture sets at a temperature of less than 1000° C., such as a temperature of less than 800° C., and further such as a temperature of less than 600° C., and yet further such as a temperature of less than 400° C., and still yet further such as a temperature of less than 200° C. In certain exemplary embodiments, the cement mixture is capable of setting at room temperature (i.e., at about 23° C.).

In certain exemplary embodiments, the cement mixture has an uncalcined modulus of rupture of at least 500 psi, such as at least 550 psi, and further such as at least 600 psi, and still further such as at least 650 psi, and yet still further such as at least 700 psi, and even yet still further such as at least 750 psi.

In certain exemplary embodiments, the cement mixture has an uncalcined modulus of rupture of at least 500 psi while the crystalline inorganic fibrous material comprises less than 20% of the total weight of the inorganic solids components of the cement mixture. In certain exemplary embodiments, the cement mixture has an uncalcined modulus of rupture of from 500 to 800 psi while the crystalline inorganic fibrous material comprises from 3% to 20% of the total weight of the inorganic solids components of the cement mixture. In certain exemplary embodiments, the cement mixture has an uncalcined modulus of rupture of from 500 to 800 psi while the crystalline inorganic fibrous material comprises from 5% to 15% of the total weight of the inorganic solids components of the cement mixture.

Cement compositions described herein can exhibit viscosities well suited for forming an external skin over a honeycomb body. For example, compositions according to the embodiments herein can have an infinite shear viscosity equal to or less than about 12 Pascal-seconds (Pa·s.), equal to or less than about 5 Pa·s., or equal to or less than about 4 Pa·s. For a shear rate of 10 s$^{-1}$, the shear viscosity may, for example, be equal to or less than about 400 Pa·s, equal to or less than about 350 Pa·s or less than or equal to about 300 Pa·s. Viscosity was measured using a parallel plate viscometer.

Calcining of cement compositions disclosed herein can be conducted in a box furnace with a linear ramp to 600° C. in 3 hours, followed by a hold for 3 hours at 600° C., then followed by a ramp down to room temperature over a time period of 3 hours. In commercial use, the ceramic article would be wash coated with catalyst followed by a heat treatment to remove organic materials. The ceramic article would also be canned with a mat material that may also require heat treatment to remove organic materials. The calcining process simulates service conditions experienced by the ceramic article.

Calcined cement compositions described herein can exhibit an elastic modulus equal to or less than about $1 \times 10^6$ Pa, equal to or less than about $7 \times 10^5$ Pa, equal to or less than about $5 \times 10^5$ Pa or equal to or less than about $4 \times 10^5$ Pa. In certain embodiments the elastic modulus is in a range from about $2 \times 10^5$ Pa to about $6 \times 10^5$ Pa.

Calcined cement compositions described herein can exhibit an average thermal shock final pass temperature of at least 600° C. using the method described as follows. First, an oven is preheated to a first temperature and stabilized. Then, a room temperature article (i.e. about 23° C.), such as a honeycomb body comprising a ceramic skin, such as embodiments thereof described herein, is plunged into the hot oven for 30 minutes. After the 30 minute period, the hot article is removed from the oven and air quenched back to room temperature without forced cooling (e.g. blowing chilled air, etc.). The article is transferred from the hot and cold locations on low thermal mass ceramic setters (1" cubes of cordierite cellular ceramic). The article is inspected for cracks in the skin and honeycomb body using non-destructive methods including visual inspection (aided with 10× magnification), transmitted light and ultrasound pulse-echo. The article is deemed to have failed when a crack is detected in the honeycomb body or cement skin. When an article survives, the oven is set to a higher temperature and the process is repeated. The last temperature passed and 1$^{st}$ temperature failed bracket the performance of the article. In the case of the data presented herein, the 1$^{st}$ temperature is 500° C. and each successive step is an addition of 50° C. The last temperature survived is reported. No temperatures in excess of 1100° C. are used.

Accordingly, in certain embodiments, the calcined cement skin of the ceramic structure exhibited no visible cracks under 10× magnification after heating to a temperature of 600° C. for 30 minutes followed by unforced cooling to 23° C. In certain other embodiments, the calcined cement skin of the ceramic structure exhibited no visible cracks under 10× magnification after heating to a temperature of 1000° C. for 30 minutes followed by unforced cooling to 23° C.

While the cement mixture compositions disclosed herein have been described for skin applications, it is contemplated that they may be used for other applications relating to honeycomb bodies and ceramic particulate filters including for plugging at least some of the ends of the channels of the honeycomb bodies or for adhering segments of honeycomb bodies together.

Table 1 shows the physical properties of two different example skin cements that have two differing sets of properties. Example 1 is strong and stiff with low porosity as indicated by a MOR of 511 psi and modulus of elasticity (Emod) of 0.49 Mpsi in the green condition and MOR of 280 psi and Emod of 0.53 Mpsi after calcination, with a porosity of 37.8%. Example 2 is weak and flexible with high porosity as indicated by a MOR of 455 psi and Emod of 0.39 Mpsi in the green condition and MOR of 54 psi and Emod of 0.29 Mpsi after calcination, with a porosity of 48.6%. One distinct difference between the two skin cements is the presence of Ludox® (colloidal silica, inorganic binder) in Example 1, which is absent in Example 2. The Ludox, increases density, particle packing, cohesion, and adhesion, due to its small particle size, higher surface area, high surface charge, and ability to penetrate into small pores, cracks, and features of the cement and body.

TABLE 1 physical properties of two different skin cements

| Skin Material | As-made | | Calcined | | |
|---|---|---|---|---|---|
| | MOR (psi) | Emod (Mpsi) | MOR (psi) | Emod (Mpsi) | % Porosity |
| Example 1 | 511 | 0.49 | 280 | 0.53 | 37.8 |
| Example 2 | 455 | 0.39 | 54 | 0.29 | 48.6 |

Oven thermal shock performance of several lots of ceramic honeycomb structure 300/5 substrates with one of the two skin cement compositions described in Table 1 applied on each lot of ceramic honeycomb structure showed that thin Example 1 skin layers performed better than thick Example 1 skin layers and that thick and thin Example 2 samples passed all conditions. The skin layers were either applied thick (standard) or thin. In some cases, the exact same lot of matrix material was used for comparison. In each case the skinned substrates were plunged into an oven at the temperatures from 450° C. for 30 minutes followed by a rapid extraction/cooling to room temperature and a crack inspection. Crack-free samples were then subjected to the next higher temperature, step-wise in 25° C. steps up to 700° C., until failure was observed in the form of a crack that penetrated into the matrix. Results showed that a thin skin layer of Example 1 performed better than a thick skin layer of Example 1 and that all Example 2 samples passed all conditions. While the Example 2 skin performs well in this test, it is weaker and less abrasion resistant and may not be as durable in handing as Example 1.

According to exemplary embodiments of the disclosure, the core skin may include at least one of the compositions mentioned above. For example, the core skin layer may comprise at least one of the strong and stiff with low porosity compositions, the weak and flexible with high porosity compositions, the single glass powder compositions, the dual glass powder compositions, the single glass powder with fibrous reinforcing material compositions, the dual glass powder with fibrous reinforcing material compositions, the inorganic filler and crystalline inorganic fibrous material compositions, and the dual glass powder and crystalline inorganic fibrous material compositions.

According to exemplary embodiments of the disclosure, the clad skin may include at least one of the compositions mentioned above. For example, the clad skin layer may comprise at least one of the strong and stiff with low porosity compositions, the weak and flexible with high porosity compositions, the single glass powder compositions, the dual glass powder compositions, the single glass powder with fibrous reinforcing material compositions, the dual glass powder with fibrous reinforcing material compositions, the inorganic filler and crystalline inorganic fibrous material compositions, and the dual glass powder and crystalline inorganic fibrous material compositions.

The clad skin can be the same composition as the core skin or the clad skin can be a different composition than the core skin. For example, the core skin may be the single glass powder with fibrous reinforcing material compositions and the clad skin may be the single glass powder with fibrous reinforcing material compositions. For example, the core skin may be the single glass powder with fibrous reinforcing material compositions and the clad skin may be the dual glass powder compositions. For example, the core skin may be a weak and flexible with high porosity composition such as Example 2, and the clad skin may be a strong and stiff with low porosity composition such as Example 1.

According to exemplary embodiments, the core skin comprises powder particles as described above. The core skin thickness may be in a range of a few powder particle diameters to several millimeters. For example, in a range of 0.10 mm to 5.0 mm or in a range of greater than 5.0 mm. For example, in a range of 0.1 mm to 3.0 mm, in a range of 0.1 mm to 2.0 mm, in a range of 0.1 mm to 1.0 mm, in a range of 0.2 mm to 2.5 mm, in a range of 0.2 mm to 1.5 mm, in a range of 0.3 mm to 3.5 mm, or in a range of 0.3 mm to 1.5 mm.

According to exemplary embodiments, the clad skin comprises powder particles as described above. The clad skin thickness may be in a range of a few powder particle diameters to several millimeters. For example, in a range of 0.10 mm to 5.0 mm or in a range of greater than 5.0 mm. For example, in a range of 0.1 mm to 3.0 mm, in a range of 0.1 mm to 2.0 mm, in a range of 0.1 mm to 1.0 mm, in a range of 0.1 mm to 0.5 mm, in a range of 0.2 mm to 2.5 mm, in a range of 0.2 mm to 1.5 mm, in a range of 0.3 mm to 3.5 mm, or in a range of 0.3 mm to 1.5 mm. The thickness of the core skin layer and the clad skin layer may vary due to imprecision of the applicator equipment, for example, centering of a ceramic honeycomb body for a doctor blade applicator. As described below with reference to FIGS. 10A and 10B, according to an exemplary embodiment of the disclosure, the dual skin layer may vary in thickness for desired applications. This variable thickness of the dual skin layer may not be possible in a single skin layer due to cracking of the single layer skin caused by variation in the skin thickness.

According to exemplary embodiments, the clad skin thickness may be in a range of 0.10 mm to 5.0 mm when the core skin thickness is in a range of 0.10 mm to 5.0 mm. For example, the clad skin thickness may be in a range of 0.1 mm to 3.0 mm, in a range of 0.2 mm to 2.5 mm, or in a range of 0.5 mm to 1.5 mm when the core skin thickness may be in a range of 0.1 mm to 4.0 mm, in a range of 0.2 mm to 3.5 mm, or in a range of 0.7 mm to 2.5 mm. The clad skin thickness may be in a range of 0.1 mm to 1.0 mm when the core skin thickness is in a range of 0.1 mm to 3.0 mm. For example, the clad skin thickness may be in a range of 0.1 mm to 0.9 mm, in a range of 0.2 mm to 0.7 mm, or in a range of 0.3 mm to 0.5 mm when the core skin thickness may be in a range of 0.1 mm to 3.5 mm, in a range of 0.2 mm to 3.0 mm, or in a range of 0.7 mm to 2.5 mm. The total thickness of the dual skin layer may be in a range from 0.2 mm to 10.0 mm, for example, about 0.2 mm to 5.0 mm, about 0.2 mm to 4.0 mm, about 0.2 mm to 2.0 mm, about 0.4 mm to 5.0 mm, about 0.4 mm to 4.0 mm, about 0.4 mm to 2.0 mm, about 0.9 mm to 5.0 mm, about 0.9 mm to 3.0 mm or about 0.9 mm to 2.5 mm. According to exemplary embodiments, a thick core cement layer may be applied and dried rapidly to form a thick core skin layer and a thin clad cement layer may be applied to the thick core layer and dried more slowly to form a thin clad skin layer and a crack free dual skin layer.

According to an exemplary embodiment of the disclosure, the core layer may be thicker than the clad layer and have a CTE close to the CTE of the ceramic honeycomb body for acceptable in service performance. The clad layer may have less porosity than the core layer and a higher MOR and Emod than the core layer for acceptable handling performance without chipping.

In an exemplary embodiment the clad skin layer can be directly on the core skin layer or an intervening skin layer may be present. The intervening skin layer may be one or more layers. Each intervening skin layer may be the same composition or a different composition as the clad and core skin layers. The intervening layer may be a skin layer with a property such as hardness, strength, flexibility, CTE, porosity, or particle size, and the like, intermediate between the core skin layer and the clad skin layer properties. That is, for example, when the core skin layer has a relatively high porosity and the clad skin layer has a relatively low porosity, the intervening skin layer may have a porosity between the relatively high porosity of the core skin layer and the relatively low porosity of the clad skin layer. Likewise when there are more than one intervening layers, each intervening layer may be a skin layer with a property intermediate between the property of the skin layer below it and the skin layer above it. In another exemplary embodiment properties of the intervening skin layers may alternate, for example, hard/soft/hard/soft, between the core skin layer and the clad skin layer.

Figure 6:
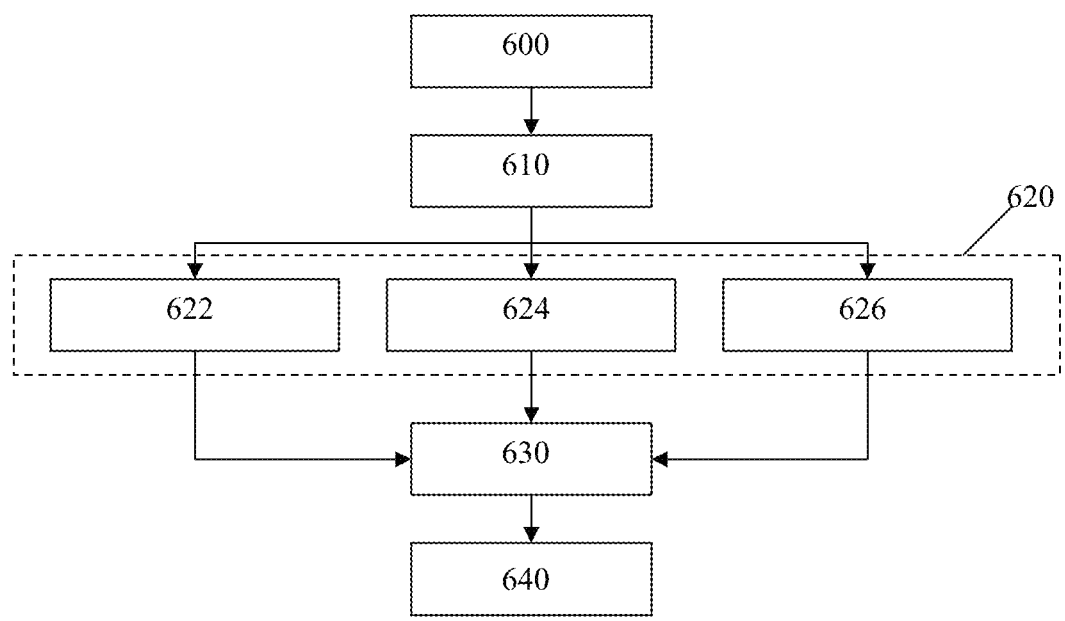
FIG. 6 is a flow diagram illustrating an exemplary process to make a double-skinned product according to exemplary embodiments of the disclosure.

In an exemplary embodiment a method of applying a dual layer skin is disclosed. A honeycomb structure fired and contoured to a diameter and shape may be applied with the dual layer skin, a honeycomb structure including a co-extruded skin layer may be applied with the dual layer skin, or a honeycomb structure including honeycomb segments may be applied with the dual layer skin. FIG. 6 is a flow diagram illustrating an exemplary process to make a double-skinned product according to exemplary embodiments of the disclosure.

In an exemplary embodiment of a method of applying a dual layer skin on a ceramic honeycomb body as shown in FIG. 6, a honeycomb body is provided in operation 600. A first coat of a cement mixture is applied to the ceramic honeycomb body in operation 610. The first coat of cement mixture is rapidly dried to form a first skin layer in operation 620. The first coat of cement mixture may be rapidly dried to form a first skin layer in operation 622 by hot air dryer (high temperature and low humidity), in operation 624 by a microwave dryer, in operation 626 by IR dryer or other similar humidity controlled drier (not shown). A second coat of a cement mixture is applied in operation 630, and dried gently in operation 640 to form a second skin layer on the first skin layer. In an exemplary embodiment of the method of applying a dual layer skin the first coat cement mixture is applied and rapidly dried. The thickness of the applied first coat of cement mixture may be in a range between 0.1 mm and 5 mm. The first coat cement mixture composition may include at least one of a strong and stiff with low porosity composition, a weak and flexible with high porosity composition, a single glass powder composition, a dual glass powder composition, a single glass powder with fibrous reinforcing material composition, a dual glass powder with fibrous reinforcing material composition, an inorganic filler and crystalline inorganic fibrous material composition, and a dual glass powder and crystalline inorganic fibrous material composition. The first coat cement mixture may be applied by an axial application method, a doctor blade squeegee application method, a spray casting method, a tape casting method, a spin coating method, and the like.

The first coat cement mixture may be rapidly dried in a process that uses high temperature hot air, forced air, microwave, RF, IR radiation, or the like. For example, the first coat cement layer may be dried under high temperature forced air at a temperature in a range of 25 to 150° C. in a time range of 30 s to 3 h. For example, the first coat cement layer may be dried under high temperature forced air at a temperature in a range of 25 to 150° C. in a time range of less than 120 min, for example less than 90 min, less than 60 min or even less than 30 min. For example, the first coat cement layer may be dried in a microwave at 10 kW to 200 kW with forced air at a temperature in a range of 100 to 150° C. in a time range of less than 1 min.

In an exemplary embodiment of the method of applying a dual layer skin the second coat of a cement mixture is applied to the first skin layer and gently dried. The thickness of the applied second coat cement mixture may be in a range between 0.1 mm and 5 mm. The second coat cement mixture composition may include at least one of a strong and stiff with low porosity composition, a weak and flexible with high porosity composition, a single glass powder composition, a dual glass powder composition, a single glass powder with fibrous reinforcing material composition, a dual glass powder with fibrous reinforcing material composition, an inorganic filler and crystalline inorganic fibrous material composition, and a dual glass powder and crystalline inorganic fibrous material composition. The second coat cement mixture may be applied by an axial application method, a doctor blade squeegee application method, a spray casting method, a tape casting method, a spin coating method, and the like.

The second coat cement mixture may be gently dried in a process that uses high temperature hot air, forced air, microwave, RF, IR radiation, or the like. For example, the second coat cement layer may be dried under high temperature forced air at a temperature in a range of 100 to 150° F. in a time range of 30 s to 2 h. For example, the second coat cement layer may be dried under high temperature forced air at a temperature in a range of 100 to 150° F. in a time range of 1 min to 5 min. For example, the second coat cement layer may be dried in a microwave at 10 kW to 200 kW with forced air at a temperature in a range of 100 to 150° F. in a time range of less than 1 min.

According to exemplary embodiments of the disclosure, a crack free dual skin layer may be achieved that has a thickness comparable to typical single layer skin in less time, because of rapid drying of the core layer followed by gentle drying of the clad layer. Although the clad layer is dried gently (lower heat and longer times than the rapid drying), comparable to a single skin layer, the time period for drying is shorter because the clad layer is the outer layer of the dual skin layer. Therefore the clad layer is thinner than the typical single layer skin.

The method for applying the first coat cement mixture and the second coat cement mixture may be the same or may be different. For example, the first coat cement mixture may be applied by a doctor blade method and the second coat cement mixture may be applied by an axial application method. For example, the first coat cement mixture may be applied by a doctor blade method and the second coat cement mixture may be applied by a doctor blade application method. For example, the first coat cement mixture may be applied by an axial application method and the second coat cement mixture may be applied by an axial application method.

Furthermore, intervening coats of cement mixture may be applied on the first coat cement layer before the second coat cement layer is applied. In exemplary embodiments where an intervening layer is applied to the core layer, the intervening layer may be applied as described in detail for the first and second coat cement layers. Therefore, further detailed description will be omitted here.

Figure 7:
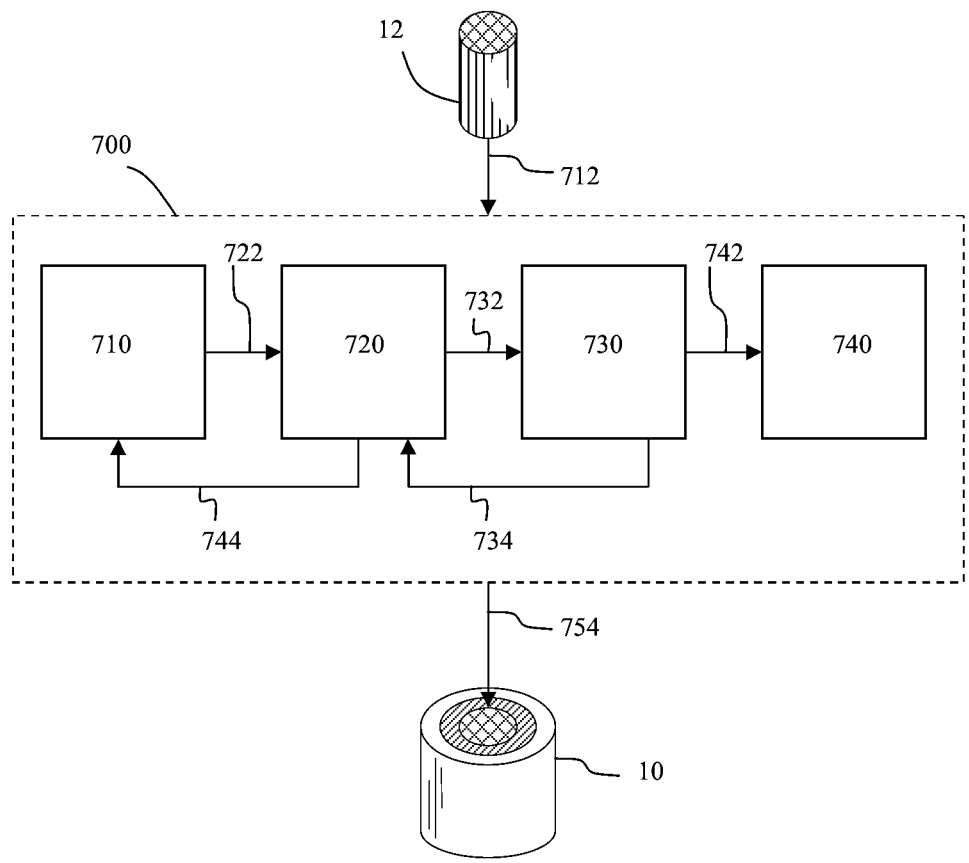
FIG. 7 is a schematic of a honeycomb body multi-layer skinning system according to an exemplary embodiment of the disclosure.

According to an exemplary embodiment of the disclosure, a system for applying the dual layer skin is provided. FIG. 7 is a schematic of a honeycomb body multilayer skinning system 700 according to an exemplary embodiment of the disclosure. The system comprises a first skinning unit 710, a first drier unit 720, a second skinning unit 730, and a second drier unit 740. The first skinning unit 710 may be an axial skinner, a doctor blade skinner, a spray cast skinner, a tape cast skinner, a spin coat skinner and the like. The first skinning unit 710 receives the honeycomb body 12 to be skinned at operation 712 and coats the honeycomb body 12 with a first cement layer. The first drier unit 720 may be a hot air drier, a forced air drier, a microwave drier, an RF drier, an IR radiation drier, and the like. The first drier unit 720 receives the honeycomb body 12 having the first cement layer at operation 722 and dries the first cement layer to form a first skin layer 36 as shown in FIGS. 1 and 2.

Figure 8:
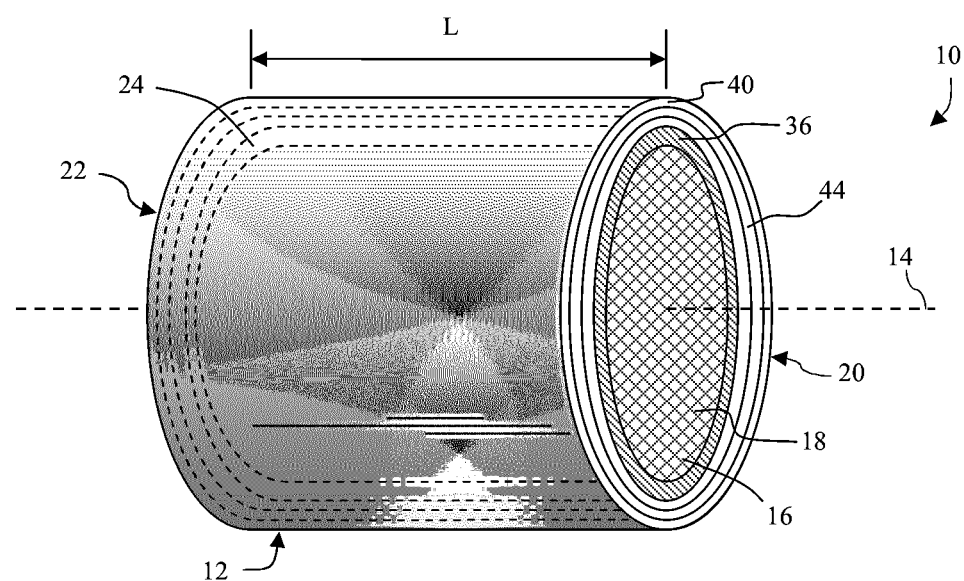
FIG. 8 is a perspective view of a honeycomb structure according to an exemplary embodiment of the present disclosure.

The second skinning unit 730 may be an axial skinner, a doctor blade skinner, a spray cast skinner, a tape cast skinner, a spin coater, and the like. The second skinning unit 730 receives the honeycomb body 12 having the first skin layer 36 at operation 732 and coats the first skin layer 36 with a second cement layer. The second drier unit 740 may be a hot air drier, a forced air drier, a microwave drier, an RF drier, an IR radiation drier, and the like. The second drier unit 740 receives the honeycomb body 12 having the second cement layer at operation 742 and dries the second cement layer to form a second skin layer 40 as shown in FIGS. 1 and 2 at operation 754. The first skin layer 36 may be the core layer and the second skin layer 40 may be the clad layer. Optionally, the system may include additional coating and drying units for intervening skin layers 44. An exemplary embodiment of an intervening skin layer 44 is shown in FIG. 8.

According to an exemplary embodiment the system may omit the second drier unit 740 by process 734 and dry the second cement layer in the first drier unit 720. Optionally, the system may omit the second skinning unit 730 and the second drier unit 740 by process 744. In such an exemplary embodiment, the first skinning unit 710 receives the honeycomb body 12 having the first skin layer 36 at operation 744 and coats the first skin layer 36 with a second cement layer. The first drier unit 720 receives the honeycomb body 12 having the second cement layer at operation 722 and dries the second cement layer to form a second skin layer 40. Furthermore, intervening skin layers 44 may be applied by operations 744 and 722 before proceeding to operation 732 or by operations 734 and 732 before operation 742.

FIG. 9A is a photograph showing an example core skin on a 2 in diameter honeycomb body according to an exemplary embodiment. Defects resulting from fast drying are visible. FIG. 9B is a photograph showing an example clad skin on a 2 in diameter honeycomb body having a core skin as shown in FIG. 9A according to an exemplary embodiment. Defects are eliminated through the second layer of skin. FIG. 9C is a photograph of the corresponding ends of the examples shown in FIGS. 9A and 9B.

Figure 10A:
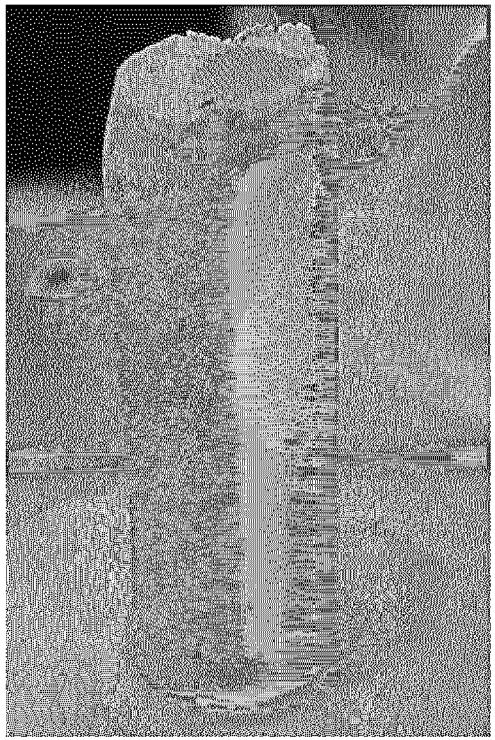
FIG. 10A is a photograph showing an example core skin on a 2 in diameter honeycomb body according to an exemplary embodiment. Defects resulting from fast drying are visible.
Figure 10B:
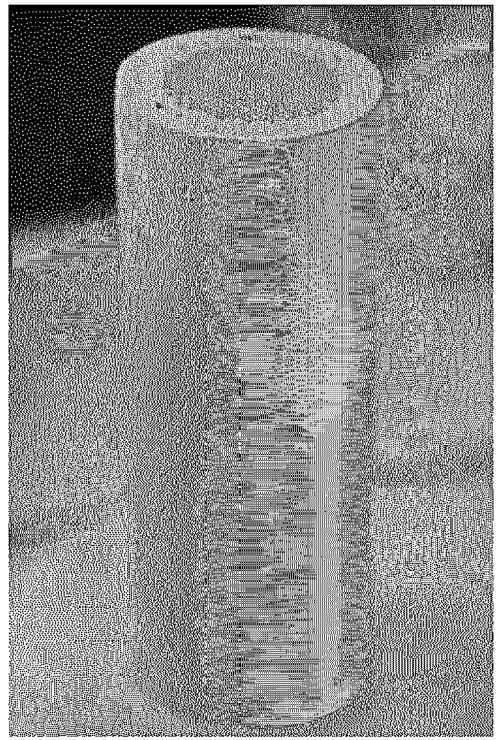
FIG. 10B is a photograph showing an example clad skin on a 2 in diameter honeycomb body having a core skin as shown in FIG. 10A according to an exemplary embodiment. Defects are eliminated through the second layer of skin.
Figure 10C:
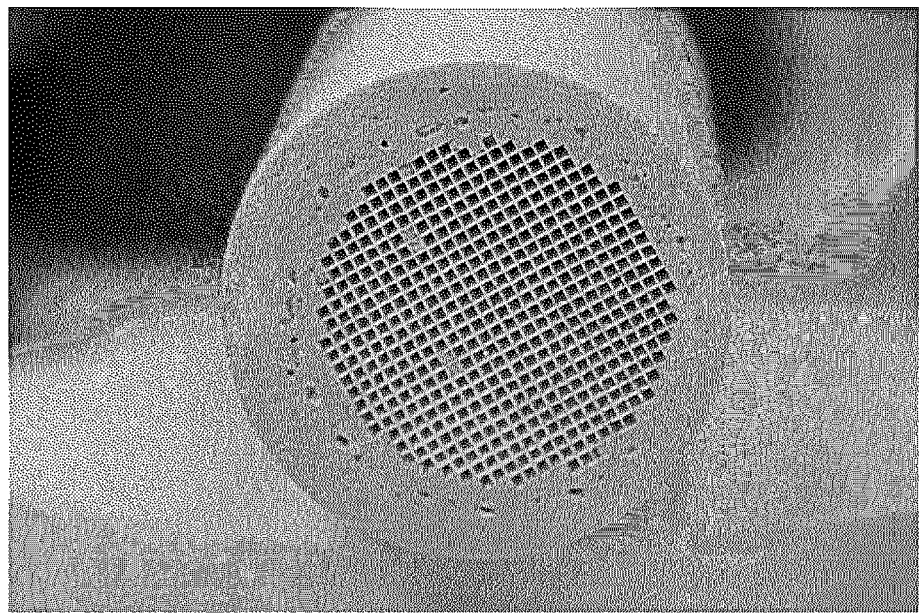
FIG. 10C is a photograph of the corresponding end of the example shown in FIG. 10B.

FIG. 10A is a photograph showing an example core skin on a 2 in diameter honeycomb body according to an exemplary embodiment. Defects resulting from fast drying are visible. FIG. 10B is a photograph showing an example clad skin on a 2 in diameter honeycomb body having a core skin as shown in FIG. 10A according to an exemplary embodiment. Defects are eliminated through the second layer of skin. FIG. 10C is a photograph of the corresponding end of the example shown in FIG. 10B.

Figure 11A:
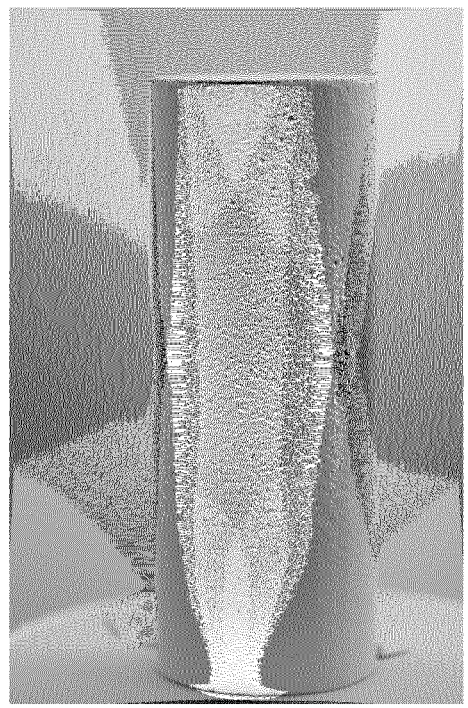
FIG. 11A is a photograph showing a side view of an example dual layer skin on a 2 in diameter honeycomb body according to an exemplary embodiment.
Figure 11B:
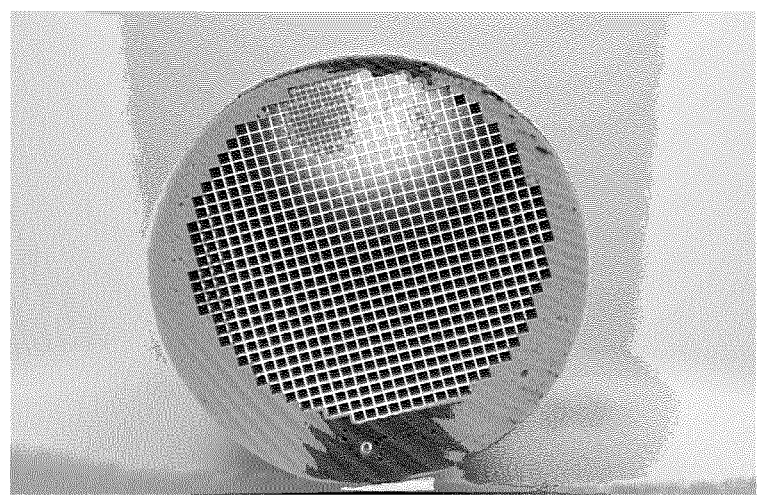
FIG. 11B is a photograph showing an end view of the dual layer skin on the 2 in diameter honeycomb body shown in FIG. 11A. The dual layer skin can be crack-free even when off-center according to exemplary embodiments as demonstrated by the example shown in FIGS. 11A and 11B.

FIG. 11A is a photograph showing a side view of an example dual layer skin on a 2 in diameter honeycomb body according to an exemplary embodiment. FIG. 11B is a photograph showing an end view of the dual layer skin on the 2 in diameter honeycomb body shown in FIG. 11A. The dual layer skin can be crack-free even when off-center according to exemplary embodiments as demonstrated by the example shown in FIGS. 11A and 11B.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A honeycomb structure, comprising:
   a honeycomb body including a plurality of cells extending axially between first and second opposing end faces of the honeycomb body, the cells comprising intersecting porous walls;
   a first cement mixture layer disposed over a periphery of the honeycomb body; and
   a second cement mixture layer disposed over the first cement mixture layer,
   wherein the first cement mixture is a calcined cement mixture or a cold set cement mixture, and the second cement mixture is a calcined cement mixture or a cold set cement mixture, and
   wherein
   the first cement mixture layer comprises a first porosity, a first modulus of rupture, and a first modulus of elasticity, and
   the second cement mixture layer comprises a second porosity less than the first porosity, a second modulus of rupture greater than the first modulus of rupture, and a second modulus of elasticity greater than the first modulus of elasticity.

2. The honeycomb structure according to claim 1, wherein an average coefficient of thermal expansion of the first cement mixture from 600° C. on cooling to room temperature is equal to or less than $20 \times 10^{-7}$/° C., and
an average coefficient of thermal expansion of the second cement mixture from 600° C. on cooling to room temperature is greater than the average coefficient of thermal expansion of the first cement mixture.

3. The honeycomb structure according to claim 1, wherein a coefficient of thermal expansion of the first cement mixture is substantially equal to a thermal expansion coefficient of the honeycomb body, and
a coefficient of thermal expansion of the second cement mixture is greater than the coefficient of thermal expansion of the first cement mixture.

4. The honeycomb structure according to claim 1, wherein an average coefficient of thermal expansion of the first cement mixture from 600° C. on cooling to room temperature is equal to or less than $10 \times 10^{-7}$/° C., and
an average coefficient of thermal expansion of the second cement mixture from 600° C. on cooling to room temperature is greater than the average coefficient of thermal expansion of the first cement mixture.

5. The honeycomb structure according to claim 1, wherein the thickness of the first cement mixture layer is in a range of 0.10 mm to 5.0 mm, and the thickness of the second cement mixture layer is in a range of 0.10 mm to 5.0 mm.

6. The honeycomb structure according to claim 5, wherein the thickness of the first cement mixture layer is in a range of 0.10 mm to 3.00 mm, and
the thickness of the second cement mixture layer is in a range of 0.10 mm to 1.00 mm.

7. The honeycomb structure according to claim 5, wherein the thickness of the first cement mixture layer is greater than the thickness of the second cement mixture layer.

8. The honeycomb structure according to claim 1, wherein the first cement mixture layer has a greater thickness variability than the second cement mixture layer.

9. The honeycomb structure according to claim 8, wherein the first cement mixture layer has a thickness variability of at least 50%.

10. The honeycomb structure according to claim 1, wherein
the first cement mixture layer comprises at least one of a single glass powder composition, a dual glass powder composition, a single glass powder with fibrous reinforcing material composition, a dual glass powder with fibrous reinforcing material composition, an inorganic filler and crystalline inorganic fibrous material composition, and a dual glass powder and crystalline inorganic fibrous material composition, and
the second cement mixture layer comprises at least one of a single glass powder composition, a dual glass powder composition, a single glass powder with fibrous reinforcing material composition, a dual glass powder with fibrous reinforcing material composition, an inorganic filler and crystalline inorganic fibrous material composition, and a dual glass powder and crystalline inorganic fibrous material composition.

11. The honeycomb structure according to claim 1, further comprising an intervening cement mixture layer disposed between the first cement mixture layer and the second cement mixture layer.

* * * * *